March 17, 1936. A. THOMAS 2,034,542
COUNTING MACHINE
Filed June 25, 1931 21 Sheets-Sheet 1
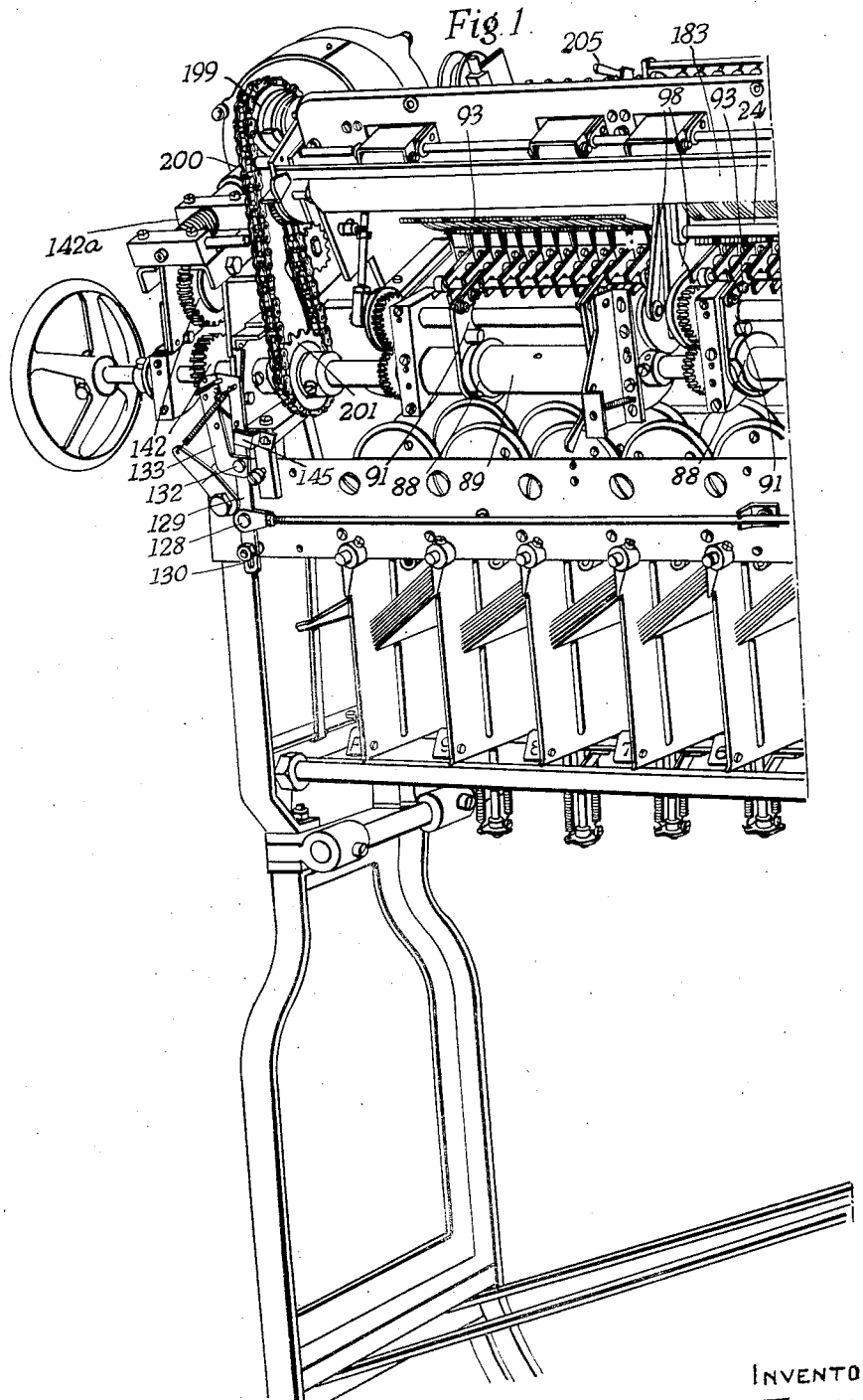
INVENTOR:-
A. THOMAS
PER:- Sydney Page
ATTORNEY March 17, 1936.  A. THOMAS  2,034,542
COUNTING MACHINE
Filed June 25, 1931  21 Sheets-Sheet 2
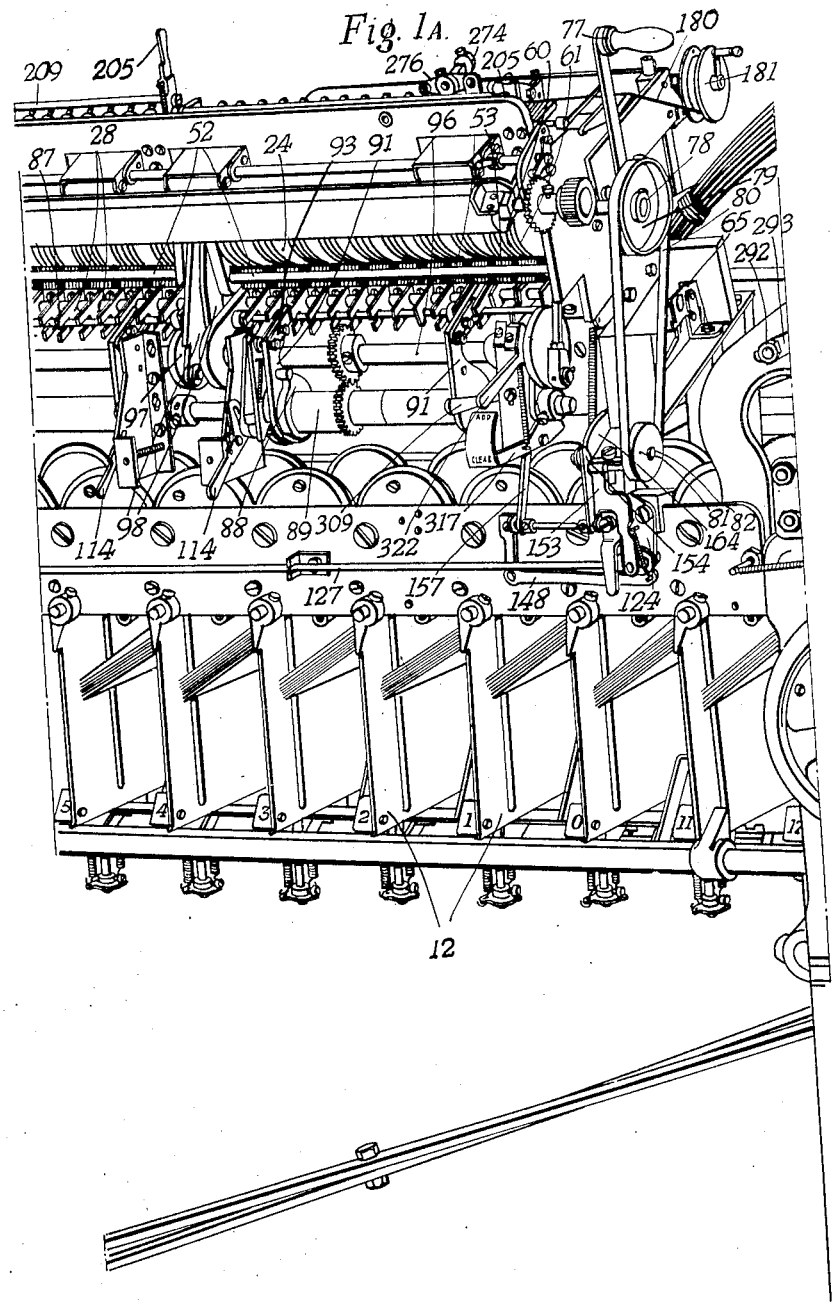
INVENTOR:—
A. THOMAS
PER:— Sydney E Page
ATTORNEY March 17, 1936.　　　A. THOMAS　　　2,034,542
COUNTING MACHINE
Filed June 25, 1931　　　21 Sheets-Sheet 3

INVENTOR:~
A. THOMAS
PER:~ *Sydney E. Page*
ATTORNEY

March 17, 1936.　　　A. THOMAS　　　2,034,542
COUNTING MACHINE
Filed June 25, 1931　　　21 Sheets-Sheet 4
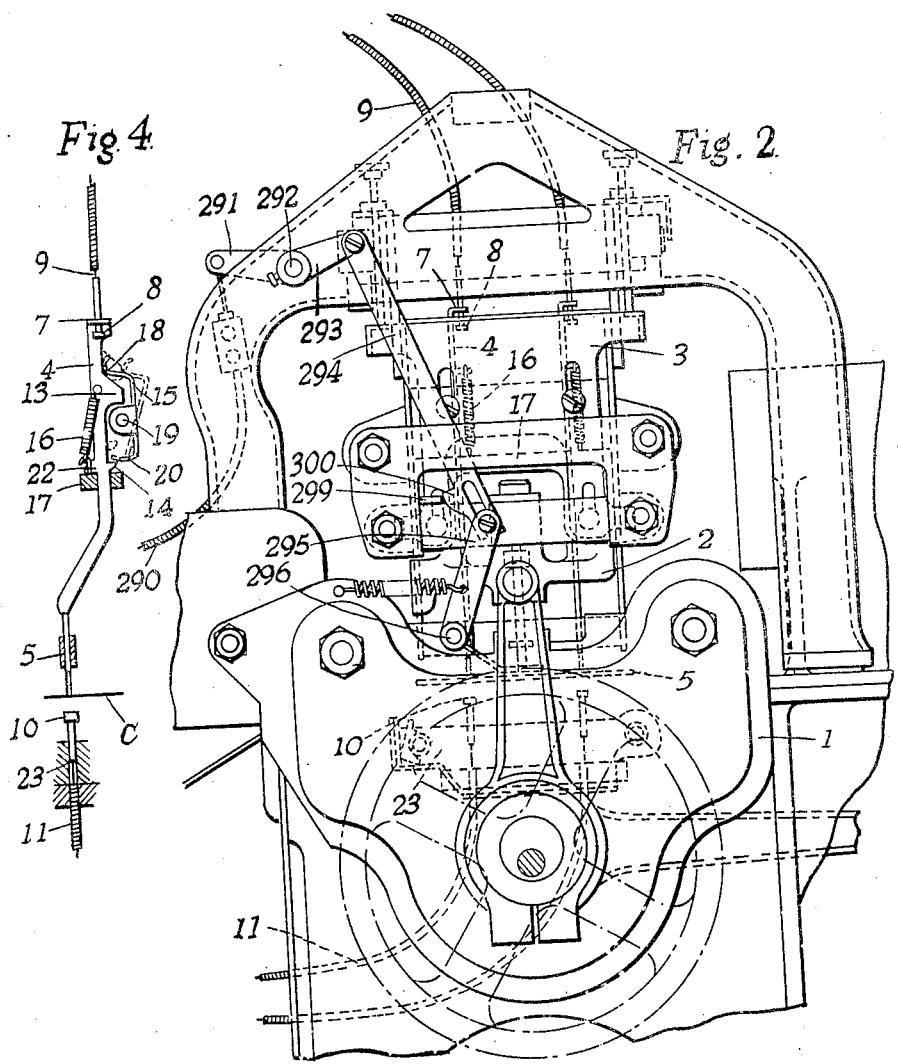
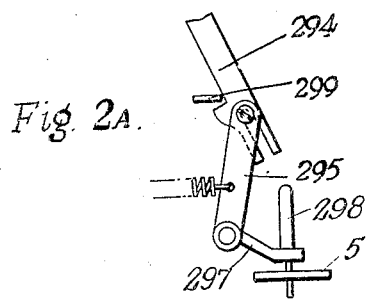
INVENTOR:-
A. THOMAS
PER:- Sydney Page
ATTORNEY.

March 17, 1936.   A. THOMAS   2,034,542
COUNTING MACHINE
Filed June 25, 1931   21 Sheets-Sheet 5

INVENTOR:~
A. THOMAS
PER:~ Sydney S Page
ATTORNEY

March 17, 1936.  A. THOMAS  2,034,542
COUNTING MACHINE
Filed June 25, 1931   21 Sheets-Sheet 6
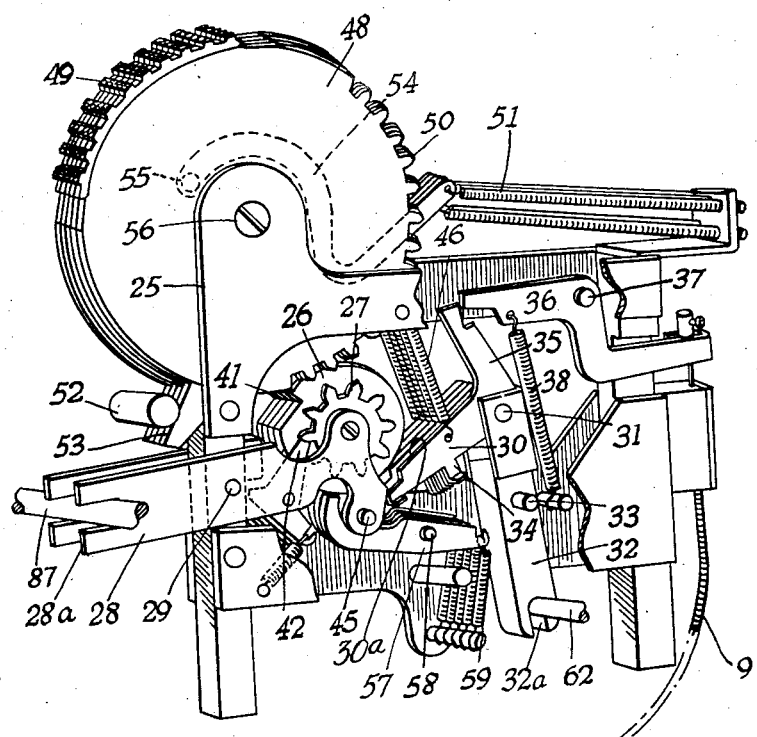
Fig. 5.
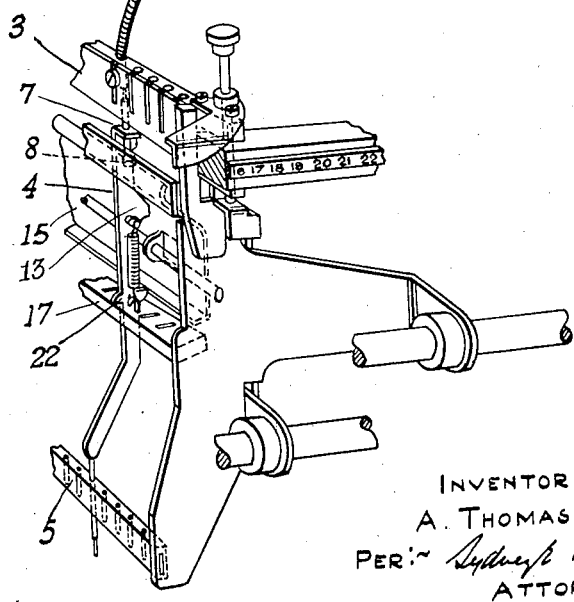
INVENTOR:-
A. THOMAS
PER:- Sydney R. Page
ATTORNEY March 17, 1936.    A. THOMAS    2,034,542
COUNTING MACHINE
Filed June 25, 1931    21 Sheets-Sheet 7
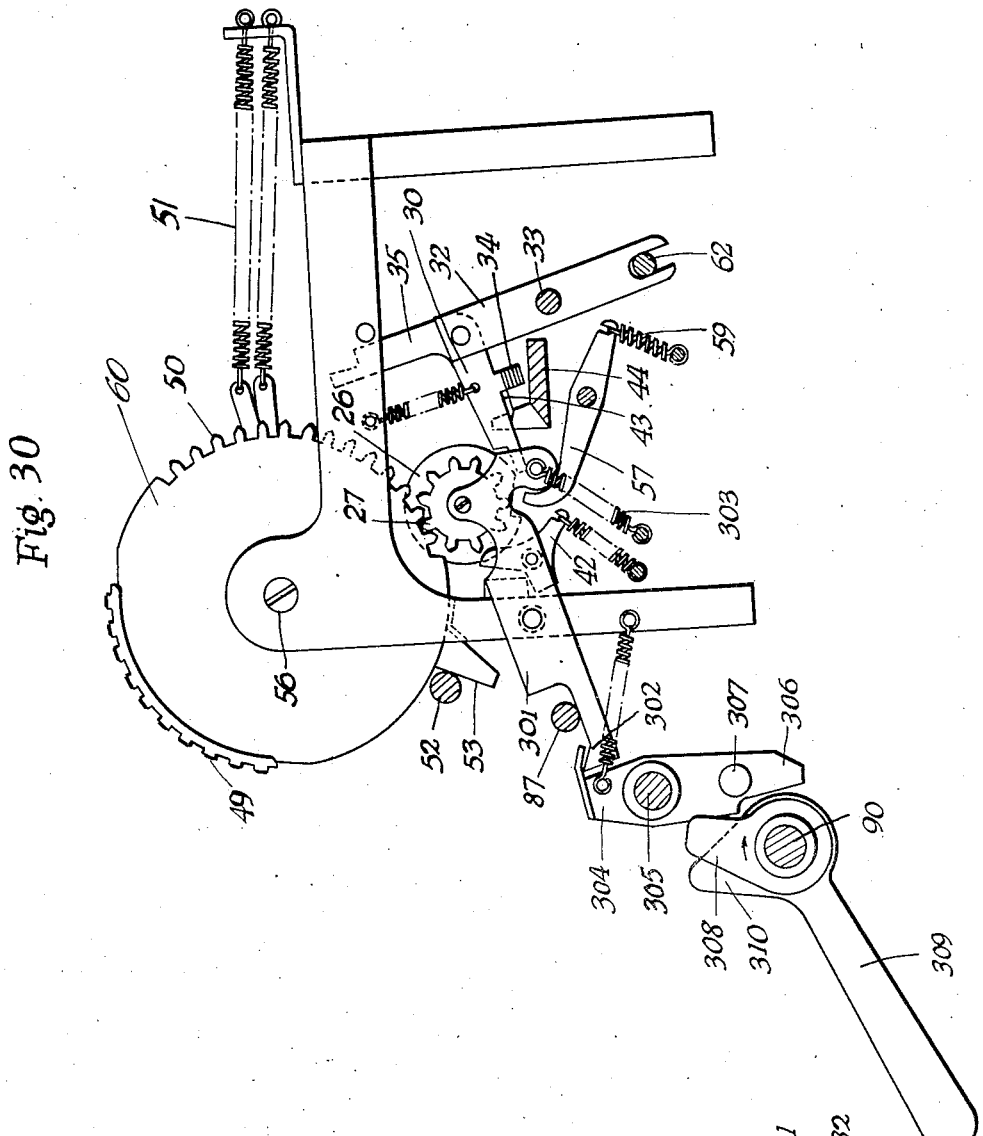
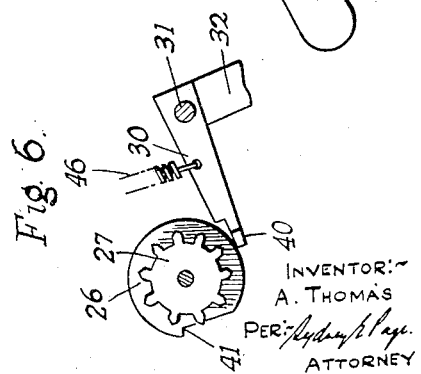
INVENTOR:-
A. THOMAS
PER: Sydney S. Page
ATTORNEY

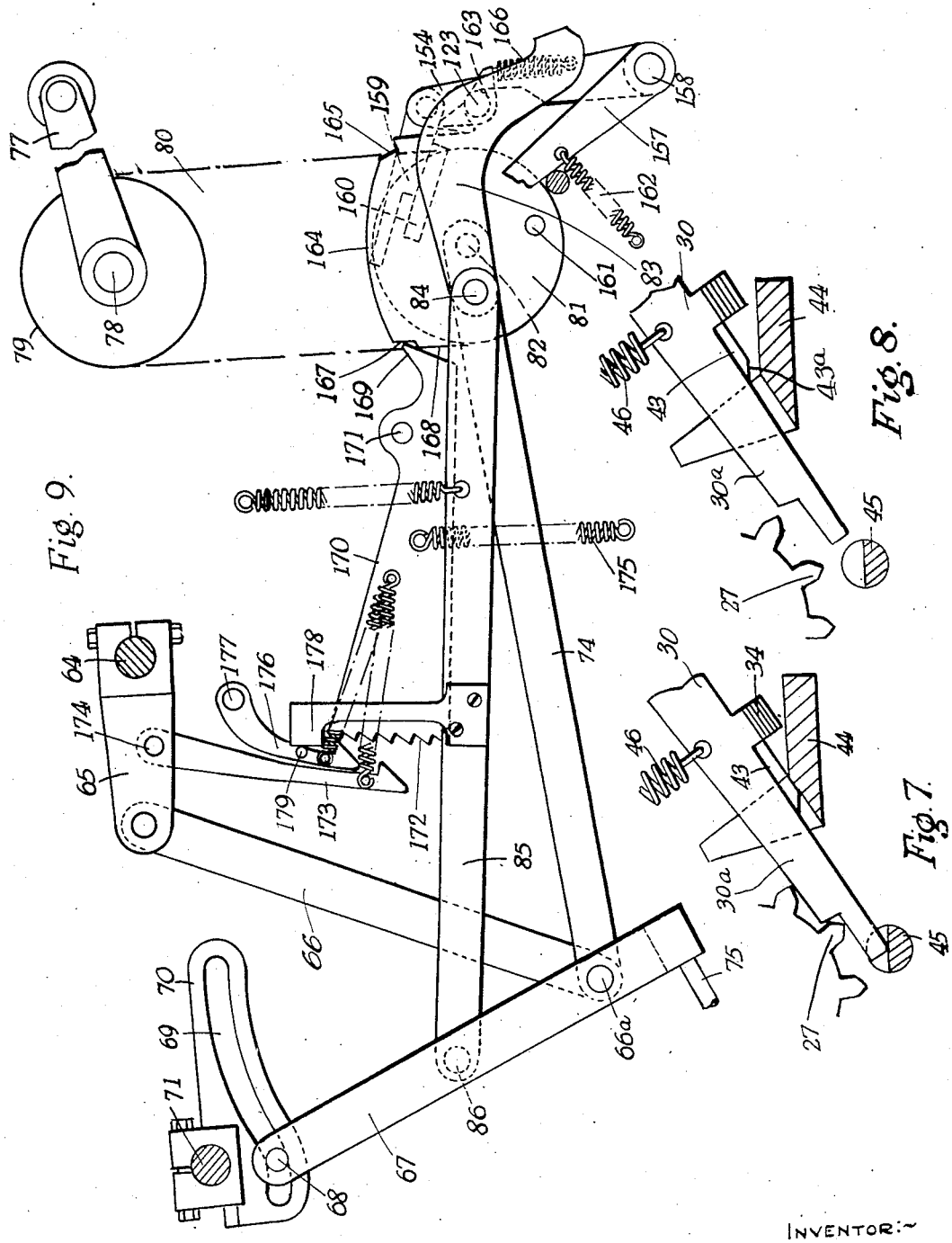

March 17, 1936.  A. THOMAS  2,034,542
COUNTING MACHINE
Filed June 25, 1931  21 Sheets-Sheet 9
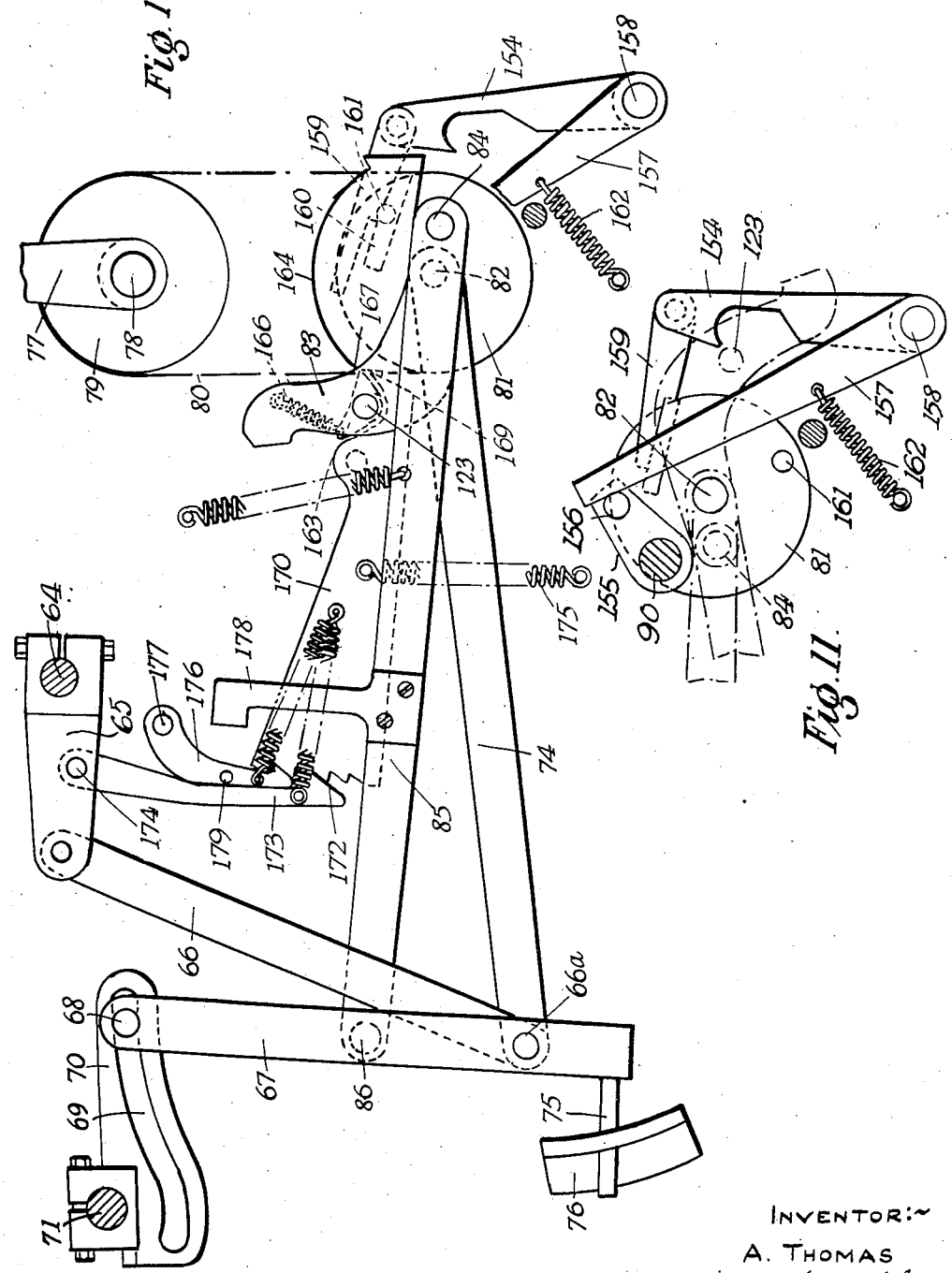
INVENTOR:-
A. THOMAS
PER:- Sydney E. Page
ATTORNEY.

March 17, 1936.  A. THOMAS  2,034,542
COUNTING MACHINE
Filed June 25, 1931  21 Sheets-Sheet 10
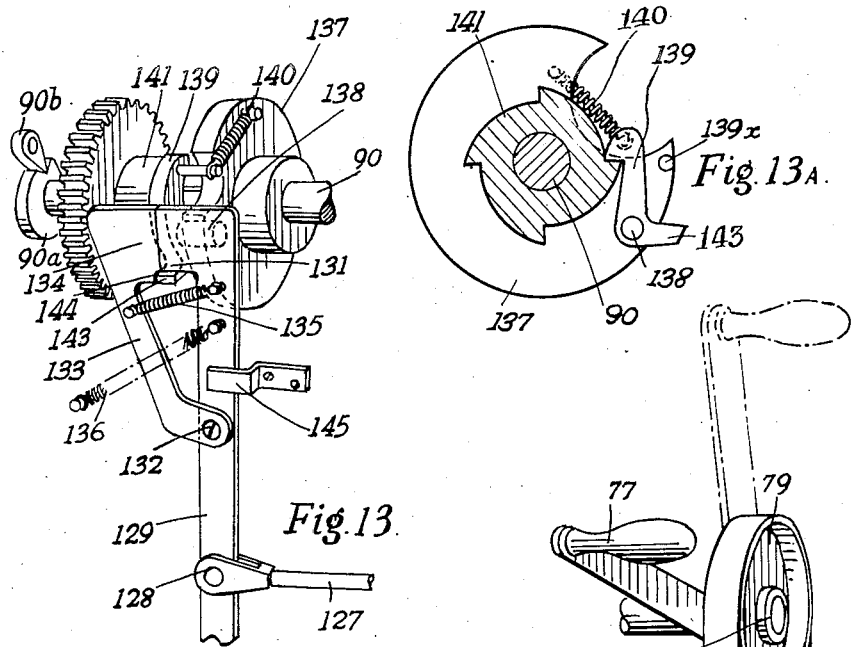
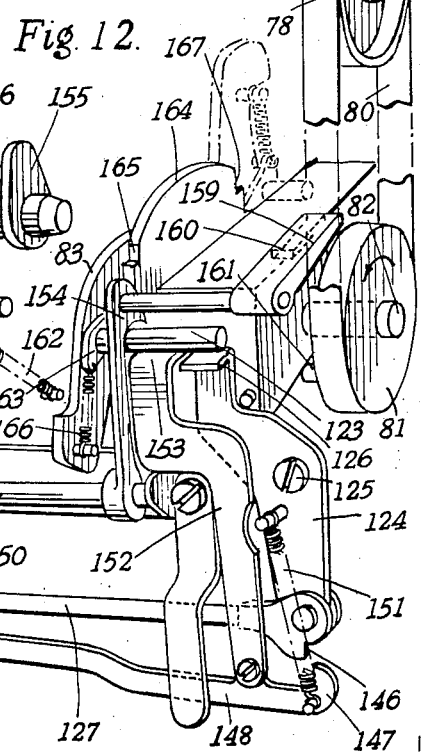
INVENTOR:-
A. THOMAS
PER:- Sydney E. Page
ATTORNEY March 17, 1936.  A. THOMAS  2,034,542
COUNTING MACHINE
Filed June 25, 1931   21 Sheets-Sheet 11

INVENTOR:-
A. THOMAS
PER:- *Sydney B. Page*
ATTORNEY

March 17, 1936.　　　　A. THOMAS　　　　2,034,542
COUNTING MACHINE
Filed June 25, 1931　　　　21 Sheets-Sheet 13
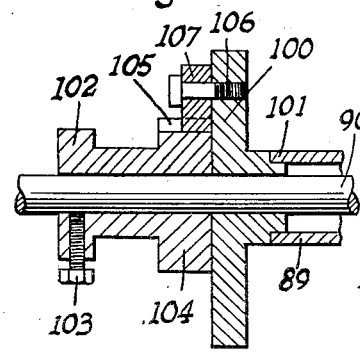
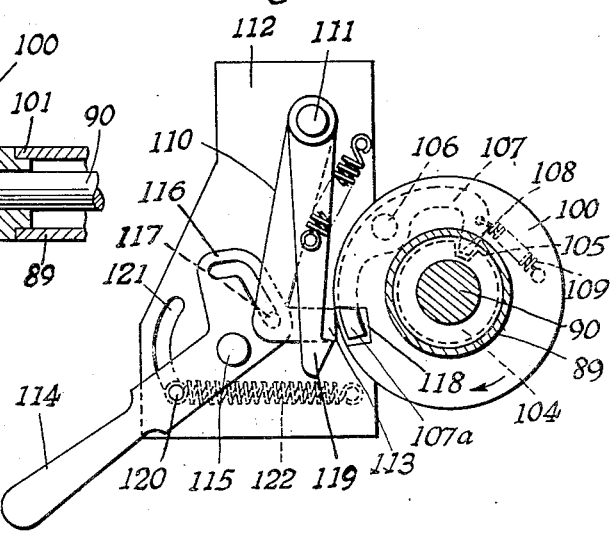
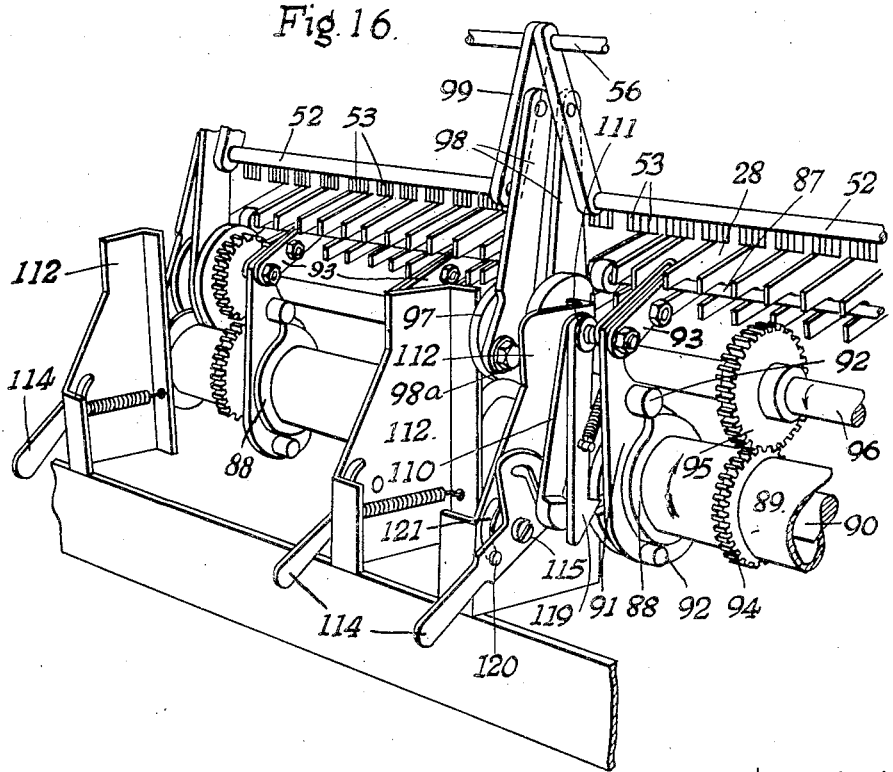
INVENTOR:~
A. THOMAS
PER:- *Sydney Page*
ATTORNEY March 17, 1936.                A. THOMAS                2,034,542
                              COUNTING MACHINE
                          Filed June 25, 1931        21 Sheets-Sheet 14

INVENTOR:~
A. THOMAS
PER:~ *Sydney E. Page*
ATTORNEY

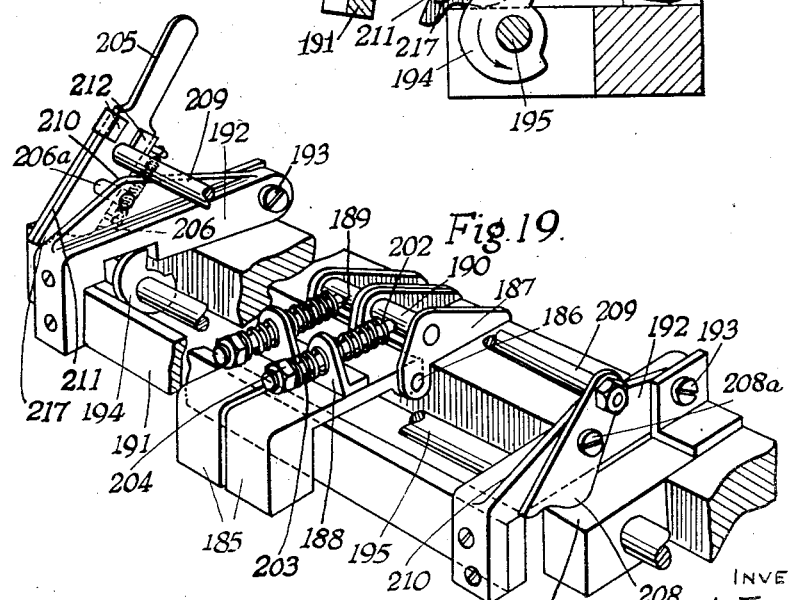

March 17, 1936. A. THOMAS 2,034,542
COUNTING MACHINE
Filed June 25, 1931 21 Sheets-Sheet 16
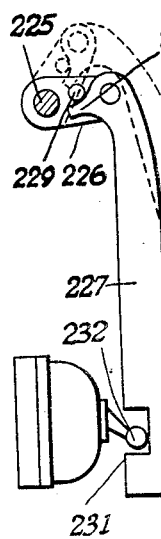
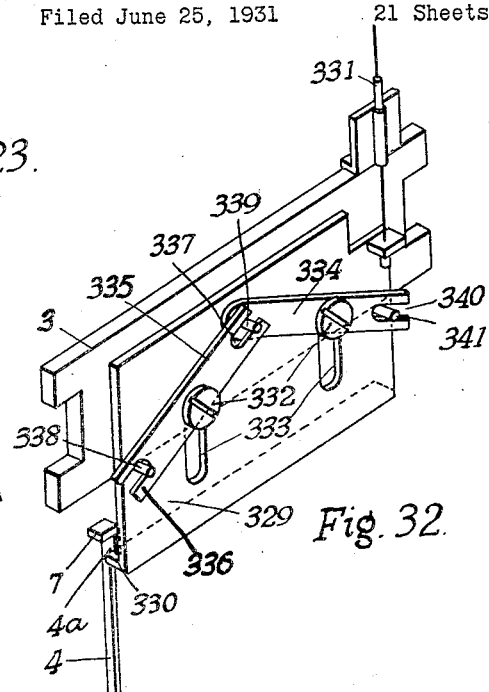
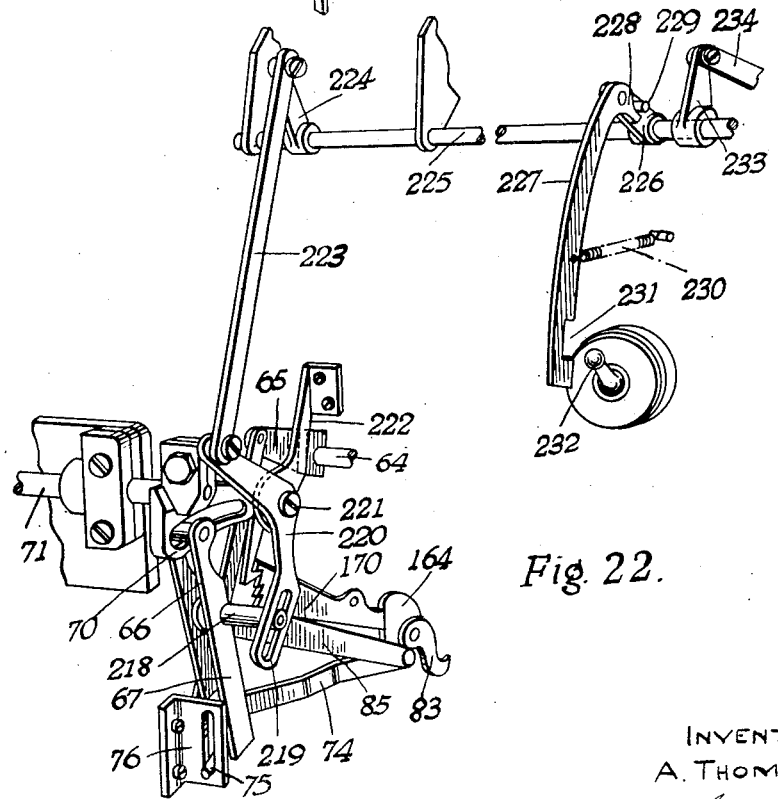
INVENTOR:-
A. THOMAS
PER:- Sydney R. Page.
ATTORNEY March 17, 1936.  A. THOMAS  2,034,542
COUNTING MACHINE
Filed June 25, 1931  21 Sheets-Sheet 17
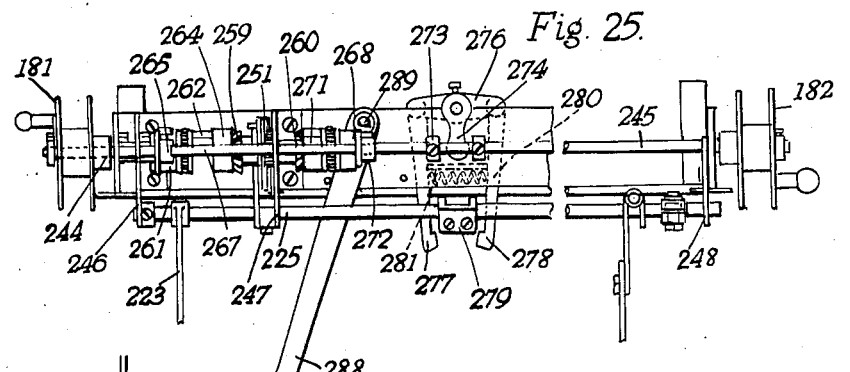
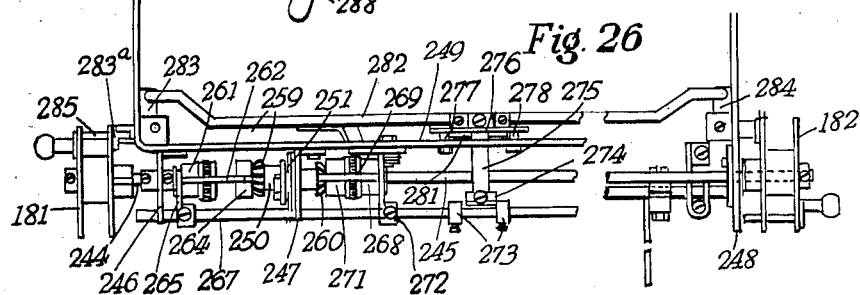
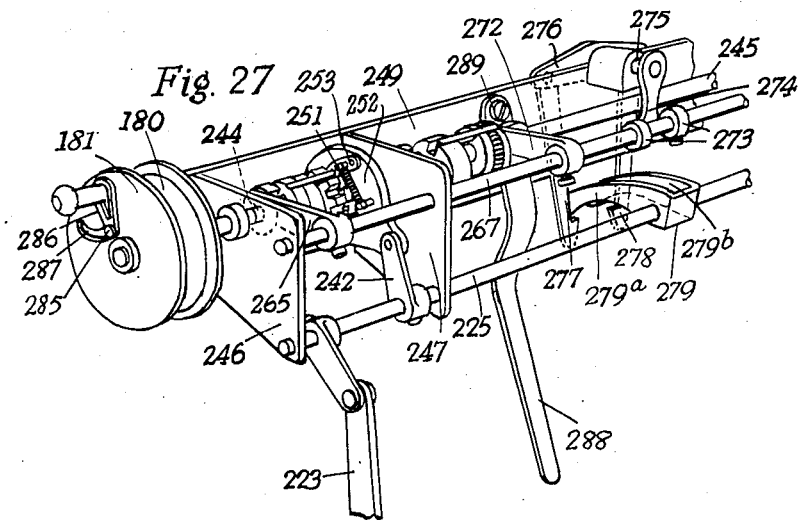
INVENTOR:—
A. THOMAS
PER:— Sydney E. Page.
ATTORNEY March 17, 1936.  A. THOMAS  2,034,542
COUNTING MACHINE
Filed June 25, 1931   21 Sheets-Sheet 18

INVENTOR:-
A. THOMAS
PER: Sydney E Page.
ATTORNEY

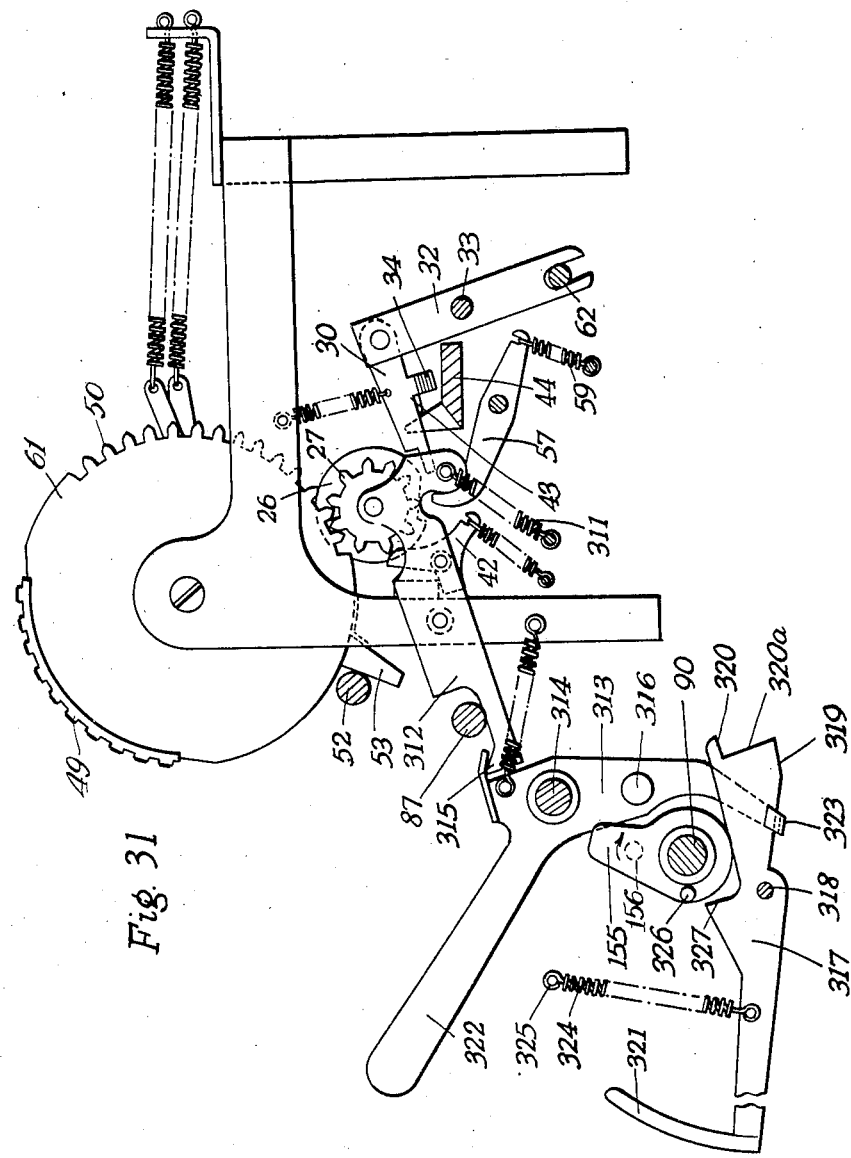

March 17, 1936.  A. THOMAS  2,034,542
COUNTING MACHINE
Filed June 25, 1931  21 Sheets-Sheet 20

INVENTOR:~
A. THOMAS
PER:~ Sydney E. Page
ATTORNEY

March 17, 1936.  A. THOMAS  2,034,542
COUNTING MACHINE
Filed June 25, 1931   21 Sheets-Sheet 21
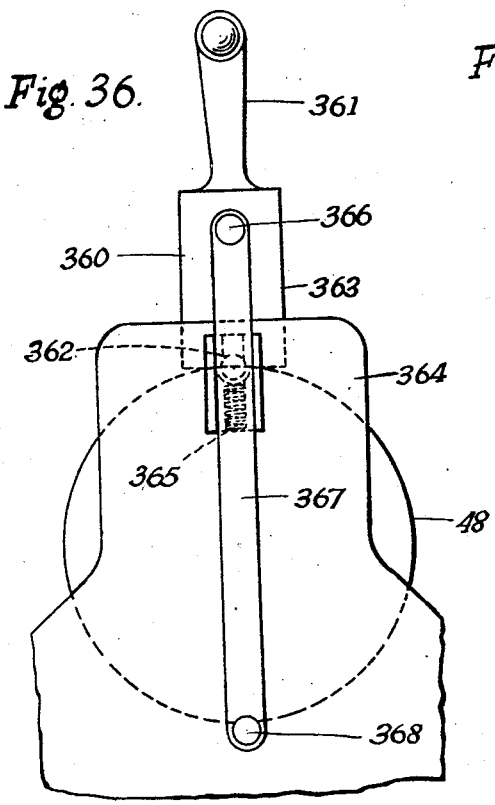
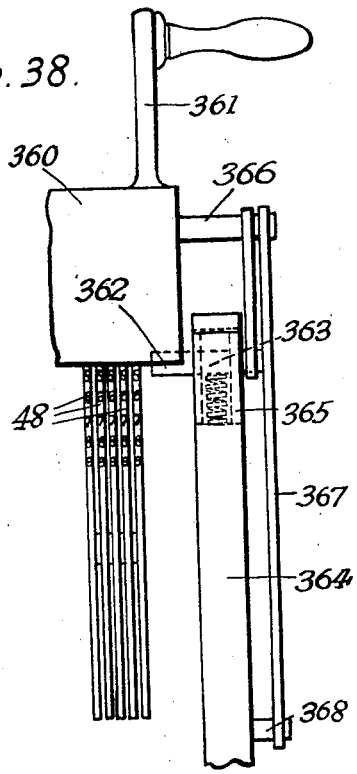
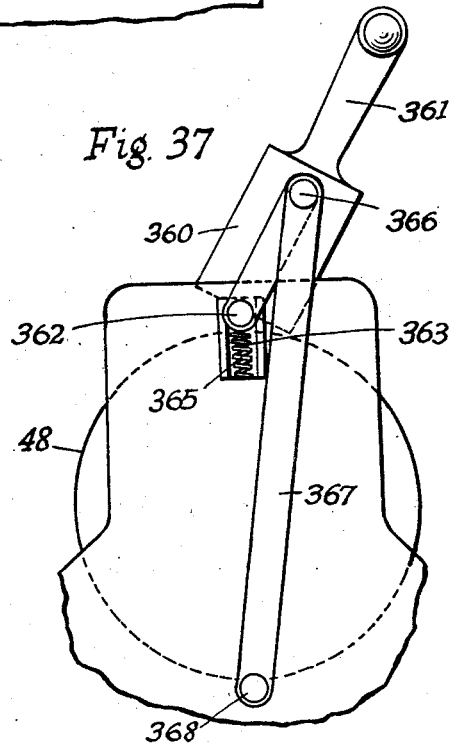
INVENTOR:~
A. THOMAS
PER:- *Sydney E. Page*
ATTORNEY Patented Mar. 17, 1936

2,034,542

UNITED STATES PATENT OFFICE 2,034,542

COUNTING MACHINE

Arthur Thomas, Thornton Heath, England, assignor to The Accounting & Tabulating Corporation of Great Britain Limited, London, England Application June 25, 1931, Serial No. 546,712
In Great Britain July 10, 1930

4 Claims. (Cl. 235—58)

This invention relates to machines for sorting statistical cards acccording to their classification, and counting the number of cards in each class.

The machine is particularly intended for dealing with the work involved in taking the census of the population.

The sorting mechanism of the machine may be of the kind described in British patent specification No. 128,207 and may comprise a plurality, for example, twelve sorting compartments each adapted to be controlled from a sensing pin in a reciprocating pin box. In the case of twelve compartments, the pin box contains twelve pins adapted to sense on one column of the usual statistical card. The cards usually have 45 columns and the pin box is displaceable so that it can be set to sense on any one of the 45 columns. Each column has twelve hole positions corresponding to the twelve compartments, and the sensing of a hole in position No. 6 in any column will effect the opening of the compartment No. 6, while the sensing of a hole in position No. 9, for example, will effect the opening of compartment No. 9 and so on.

It has already been proposed in British patent specification No. 172,043 to provide three pin boxes, each adapted to sense on one column of the card, and each adapted to be displaced, so that different columns may be sensed by the same pin box.

Further, each of the pins in the three pin boxes was connected to an individual units counter device, so that when any pin sensed a hole in the card, its associated counter was actuated to count one. There were thus 36 counters and if hole No. 5 in any column was sensed by the No. 5 pin in pin box No. 1, counter No. 5 was actuated, whereas if hole No. 5 was sensed by the No. 5 pin in No. 2 pin box, counter No. 17 was actuated to count one.

Assuming that the three pin boxes are set to sense on three columns which may be conveniently called columns Nos. 1, 2 and 3, each hole position in the columns represented a population classification, in the case of census work, for example, hole position No. 1 in column No. 1 might represent engineers between the ages of 20 and 30, hole position No. 2 in column No. 2 engineers between the ages of 30 and 40, and so on, while hole position No. 1 in column No. 2 might represent bricklayers of a certain age, while the other hole positions in the three columns would represent persons engaged in different trades and of different age groups.

Since each time a hole is sensed, the corresponding counter is actuated to count one, the result is that each of the 36 counters at the end of a run of the machine, has recorded a total of the number of persons whose classification code or designation is given by the hole position corresponding to the counter in question.

An object of the invention is to provide a machine which will give an improved arrangement of the printed results of the counting operation, whereby all entries relating to any one heading and which, therefore, require to be added up to give a total for that heading, are printed in one and the same column, thus obviating the necessity for taking out different entries from the same column as was necessary in machines hitherto proposed, wherein entries relating to different headings were printed in the same column, and could not, therefore, be added up to give a total under any one particular heading. Thus, for example, if the invention is applied to the counting of cards which are being sorted and if, further, the cards are being sorted, for example in accordance with age groups, then all the entries relating to the age groups 26 and 30 will appear in a separate column and so forth.

A further object of the invention is to provide a machine in which the results obtained on three sets of five or six figure counters, there being, for example, twelve counters in each set, are printed in line simultaneously on a single sheet of paper.

The invention also has for its object to provide improvements in the means for controlling such mechanism in order to prevent as far as possible mishandling of the machine, and further to provide means whereby all the printing operations can be controlled from a single operating handle.

According to the present invention a counting machine comprises a plurality, for example thirty-eight, of individual counting units disposed in axial alignment and means for obtaining a printed record of the results of a counting operation, whereby the data obtained from a counting operation is analyzed in column form, so that the counters relating to any one heading all appear one below the other in a single column.

A machine according to the invention may comprise in combination analyzing mechanism for statistical or like record cards, a plurality of individual counting units disposed in axial alignment and means for obtaining a printed result of a counting operation, whereby data derived from each counting operation is itself analyzed in column form, so that the entries relating to any one heading will appear one below the other.

In one construction according to the invention, a counting machine comprises in combination analyzing mechanism for statistical or like record cards, a plurality of toothed printing elements, counting mechanism adapted to be operated by card analyzing mechanism, means for bringing the counting mechanism and printing elements into operative engagement with one another, means for zeroizing the counting mechanism whereby the amount stored therein is transferred to the printing elements and means for printing the amount thus transferred to the printing elements.

For example, in applying the invention to a machine for counting and sorting cards, the counting mechanism may be operated through Bowden cables from a reciprocating pin box and after the desired number of cards has been counted, the counting mechanism may be brought into operative engagement with the printing elements, and the number of the cards which has passed through the machine and which is registered by the counters may be transferred to the printing elements and a printed record obtained.

According to a further feature of the invention, a single control handle is provided having a counting position and a printing position, and means are provided whereby when said handle is in the counting position, the counting mechanism is operative and the printing mechanism is inoperative, whereas when the handle is in the printing position, the printing mechanism is operative and the counting mechanism inoperative. Conveniently operative connections are provided between the said handle and the counter actuating mechanism, the mechanism for bringing the counting mechanism and printing elements into operative engagement with one another, the mechanism for zeroizing the counting mechanism and the mechanism for printing the amount indicated on the printing elements. These operative connections are such that when the control handle is in the counting position, the counter actuating mechanism is operative and the remainder of the aforesaid mechanisms are inoperative, whereas when the control handle is in the printing position the counter actuating mechanism is inoperative and the remaining mechanisms are operative.

Timing means is provided ensuring that when the control handle is moved into the printing position, the counting mechanism and printing elements are first brought into operative engagement with one another, the counting mechanism is then zeroized and the printing operation then performed. Also, if desired, operative connections may be provided between the control handle and means for feeding paper and an ink ribbon, and also means for actuating the printing hammers or other printing means, whereby the entire printing operation may be controlled by one movement of a single handle.

Preferably also means may be provided whereby when the handle for controlling the printing and counting mechanisms has been moved from the counting position to the printing position, it cannot be returned to the counting position until the printing operation has been completed.

In addition means may be provided whereby the control handle is locked after it has been moved into the counting position until the machine has made a predetermined number of revolutions.

One form of machine according to the invention comprises an analyzing mechanism for statistical or like record cards, a plurality of individual counting units, obstructor mechanism normally preventing operation of all said counting units and means controlled by the analyzing mechanism for rendering said obstructor mechanism inoperative in respect of a particular unit, when a card bearing an entry which is to be counted by that unit passes through the analyzing mechanism, whereby said counting unit is permitted to count one unit.

Preferably the machine comprises an analyzing pin box for statistical or like record cards and a plurality of counters each constructed in accordance with the specification of my co-pending U. S. patent application Serial No. 546,713, filed June 25, 1931, the operating pawls for the units counting wheel of each counter being pivoted to an actuating member which is itself pivoted to the frame of the machine. All the actuating members are oscillated about their pivots once for each cycle of the machine, while each units operating pawl is provided with an extension adapted to engage with an obstructor which is normally held in the path of the extension by means of a spring, and connected to a pin in the pin box, whereby normally the oscillations of the pawl actuating members are rendered ineffective, but when a pin passes through a hole in a card the respective obstructor is withdrawn and the pawl is permitted to actuate the respective counting unit.

One construction of the machine according to the invention is illustrated by way of example in the accompanying drawings in which Figs. 1, 1A, and 1B together show a general view of the machine;

Fig. 2 is an end elevation of the pin box;

Fig. 2A shows a detail of the pin box;

Fig. 4 illustrates the construction of one of the pins;

Fig. 5 illustrates a counting unit and its connection to the pin box;

Figure 14:
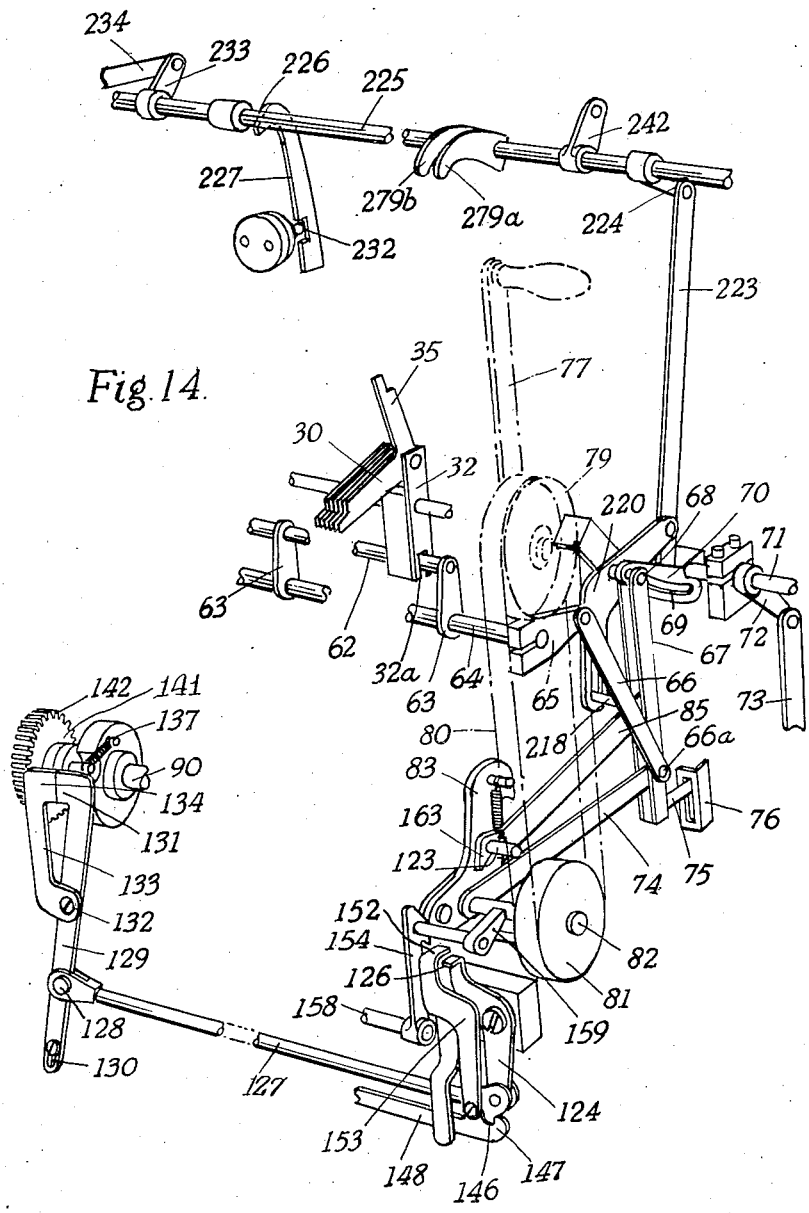
Figure 15:
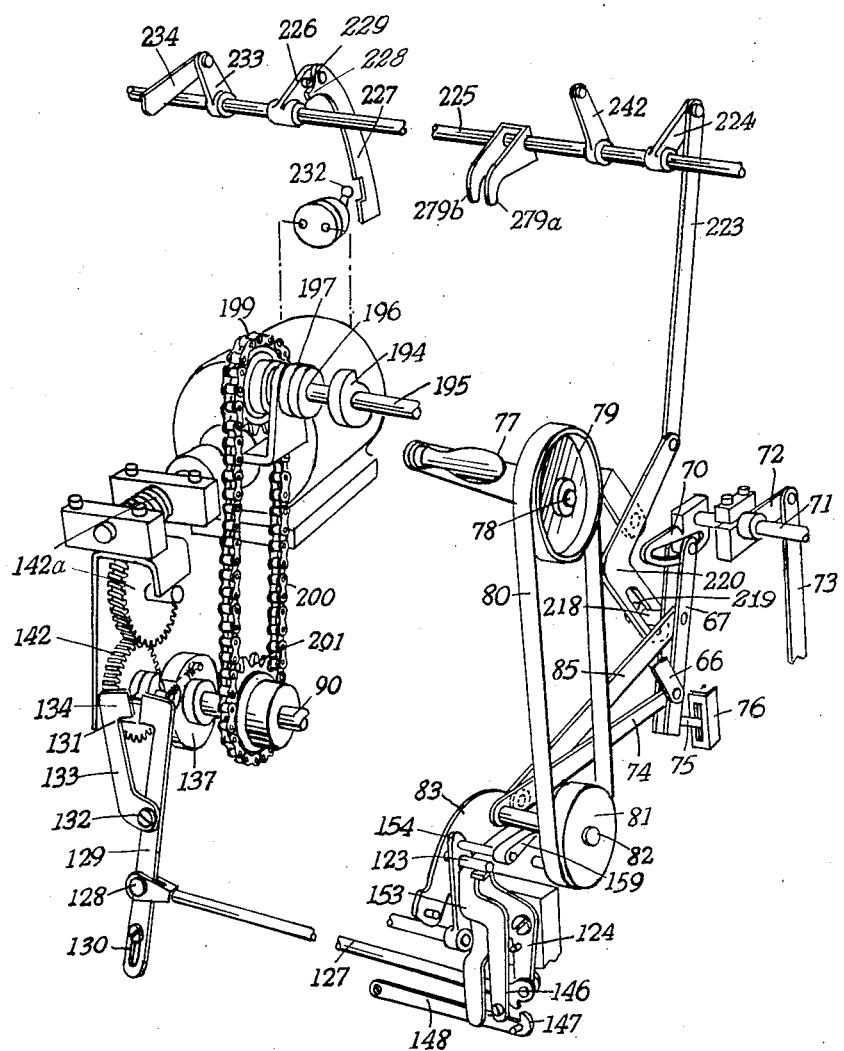
Figure 24:
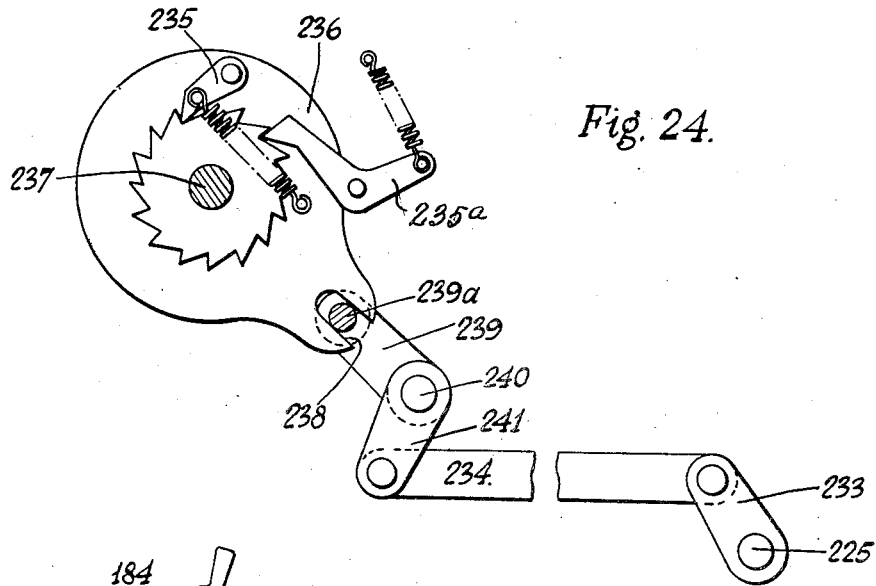
Figure 18:
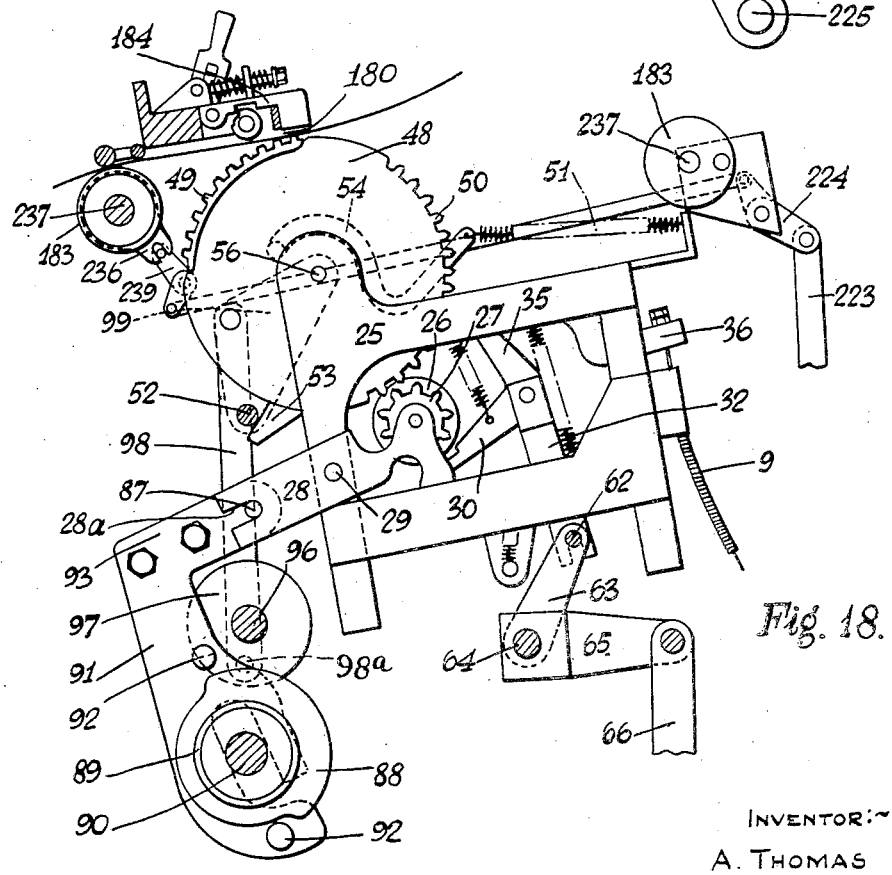

Figs. 6, 7, and 8 illustrate details of the pawl construction in the counting units;

Figs. 9 and 10 illustrate the control handle together with its connections to the counter actuating arm and also the means for locking the handle in the printing and counting positions;

Fig. 11 illustrates a detail of the latching mechanism for locking the handle in the printing position;

Fig. 12 also illustrates the control handle and its connection to the scissors device;

Fig. 13 shows the pawl of the one revolution clutch engaged and held by the scissors device;

Fig. 13A illustrates the clutch in elevation;

Figs. 14 and 15 illustrate the connections from the control handle to the various parts which it controls, the handle being shown in the counting position in Fig. 14 and in the printing position in Fig. 15;

Fig. 16 illustrates the mechanism for bringing the counting wheels into and out of engagement with the printing discs and for operating the restoring bar for the printing discs;

Fig. 17 is a detail view showing the construction of the clutch for throwing out of operation the mechanism illustrated in Fig. 16;

Fig. 17A is a cross section through the clutch shown in Fig. 17;

Fig. 18 is a diagrammatic cross sectional view through the machine showing the counting and printing mechanism and the disposition of the hammers and paper feed mechanism;

Fig. 19 is a perspective view showing the printing hammers for one bank of counters;

Figs. 20 and 21 are detail views of the hammer construction;

Fig. 22 illustrates the connection between the control handle and the switch for the motor;

Fig. 23 illustrates the operating arm for the switch shown in Fig. 22;

Fig. 24 illustrates the paper feed ratchet and pawl construction;

Fig. 25 illustrates the ribbon feed mechanism in elevation;

Fig. 26 illustrates this mechanism in plan, while

Figure 29:
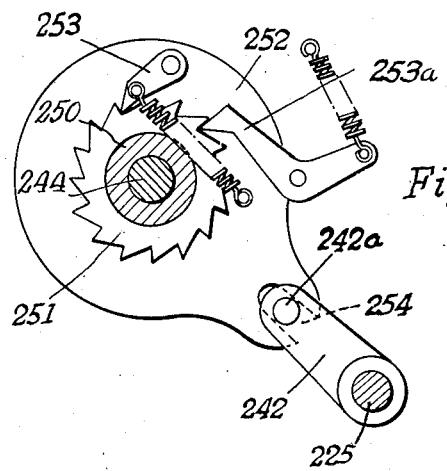
Figure 28:
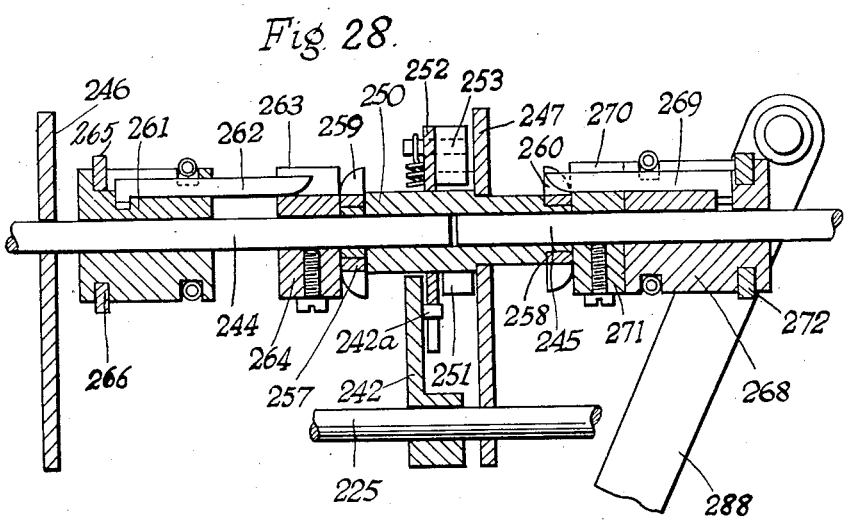
Figure 33:
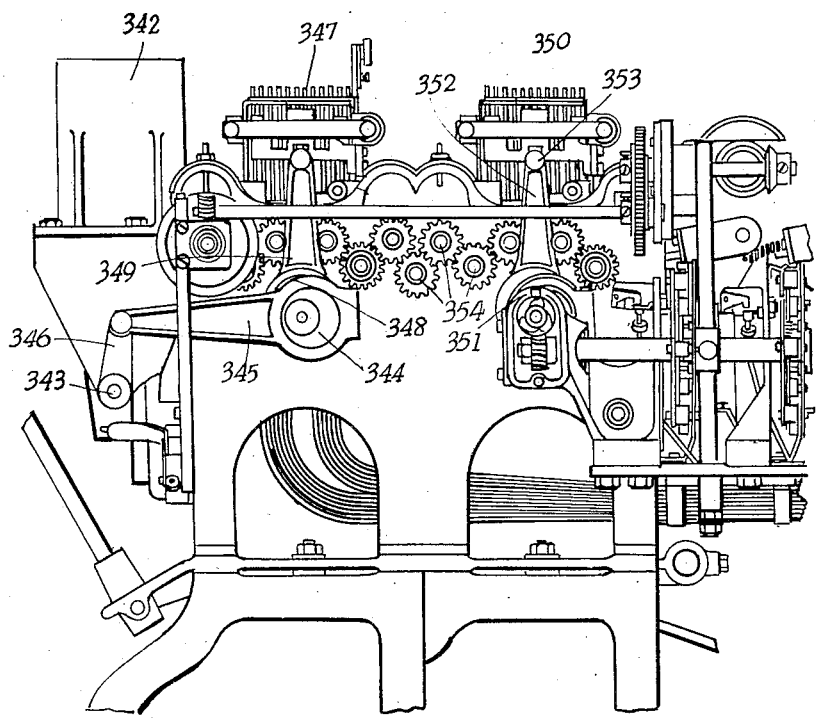

Fig. 27 is a perspective view of the reversing mechanism for the ribbon feed;

Fig. 28 is an enlarged cross sectional elevation of the clutches for the ribbon feed;

Fig. 29 illustrates the ratchet and pawl for the ribbon feed mechanism;

Fig. 30 is an elevation of the sub-total counting unit;

Fig. 31 illustrates the grand total counting unit;

Fig. 32 illustrates the means for obtaining a cross total of all the holes counted in one bank of counters;

Fig. 33 illustrates an alternative construction in which a separate pin box is used for sorting independently of the pin box used for operating the counting mechanism;

Figs. 34 and 35 are two views of an alternative construction of printing hammer and Figs. 36, 37, and 38 illustrate a form of manually operable printing bar which may be used if desired in place of the printing hammers.

In the drawings like reference numerals designate the same or similar parts.

*General construction*

In the construction shown in the drawings, the invention is shown as applied to a sorting machine comprising a sensing pin box of which the pins are adapted both to operate sorting compartments and also to operate counters. The machine comprises a frame 1 having a pin box 2 provided with three adjustable pin-carrying frames 3, each carrying twelve sensing pins 4. The pin box 2 (Fig. 2) is disposed over a perforated plate 5 formed with as many perforations as it is possible to make on a card.

Figure 3:
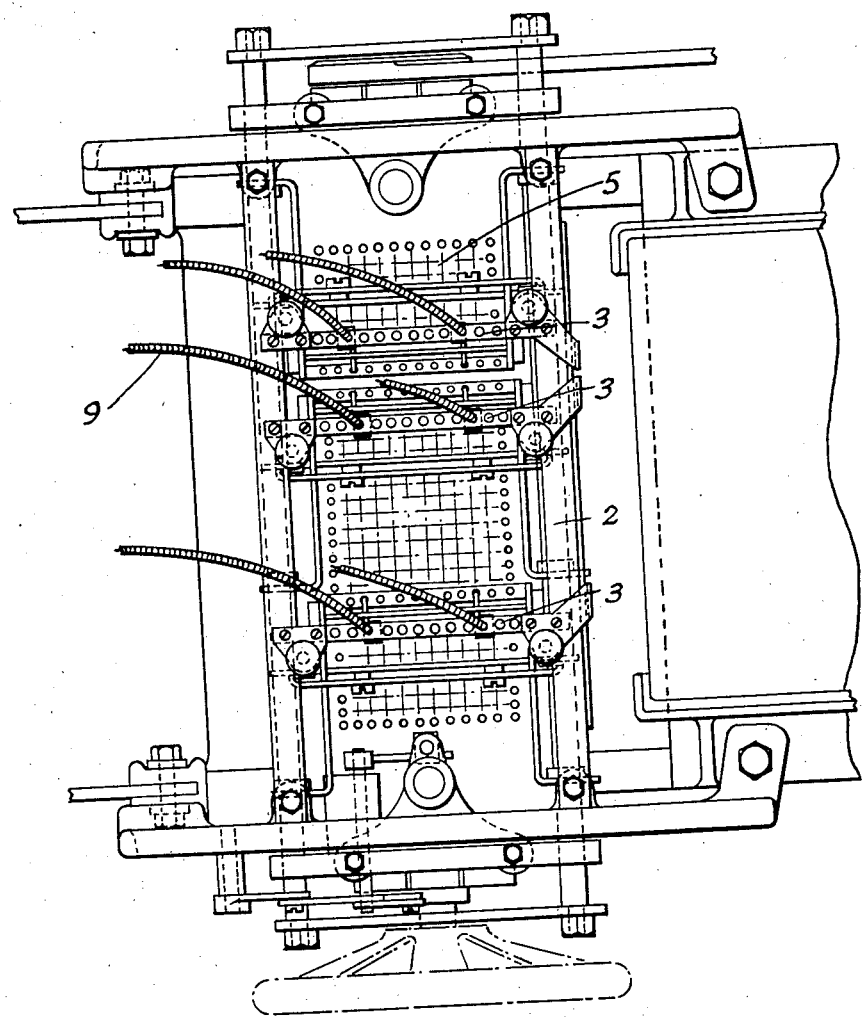
Fig. 3 is a plan view of the pin box.

The three frames 3 (Fig. 3) are laterally adjustable in the pin box so that they can be disposed over any column of the card. The pins are of the form shown in Fig. 4 and the upper end of each pin is provided with a lug 7 to engage with a nipple 8 on the end of a Bowden cable 9, which serves to actuate a counter as will be described later. The lower end of each pin passes through a hole in the perforated plate 5 and is adapted to co-operate with a plunger 10 connected by a Bowden cable 11 to the flap of a sorting compartment 12, as described in British Patent Specification No. 328,294. Each pin carries two projections 13 and 14 which co-operate with a pivoted shutter 15. One shutter (Fig. 5) 15 is provided for each column of pins and is pivoted to the frame 3 carrying these pins. When the pin box is in its uppermost position as shown in Fig. 2 there is a clearance between the lug 7 and the nipple 8. During the descent of the pin box, this clearance is fully taken up. The pins 4 are attached by means of a spring 16 to a cross bar 17 secured to the pin box frame 3 and when the pin box descends those pins which do not find a hole in the card are held up by the card and their springs 16 are extended. Consequently, the Bowden cables 9 and 11 are not actuated. The pins which pass through holes in the cards are locked to the pin box by means of the shutter 15 and during the latter portion of the descent of the pin box these pins are forcibly lowered with the pin box, so that the lugs 7 on their upper ends engage with the nipples 8 on the Bowden cables 9, whereby the respective counters are actuated. Simultaneously the lower ends of the pins depress the corresponding plungers 10 and operate the sorting compartment flaps.

The operation of the shutter is as follows:—

When the pin box descends a projecting rib 18 on the shutter engages with the projections 13 on the pins which do not pass through the card and since the shutter 15 is common to all the pins in the frame it turns about its pivot 19 and its lower edge 20 abuts against the lower projection 14 of the pin or pins which have passed through the card (Fig. 4). During the further downward movement of the pin box, therefore, the shutter positively drives the pin downwards to operate the Bowden cables. The pin is brought up again when the pin box rises by means of the bar 17 engaging with a third projection 22 on each pin.

The plungers 10 are mounted in a plunger bed 23 which can be adjusted so as to be set beneath any card column.

*Counters*

Mounted on the upper part of the sorting machine is a frame carrying a plurality of counting units, indicated generally at 24, (Figs. 1 and 1A) arranged side by side in one long row, there being a counting unit for each pin of the three columns and also a sub-total and grand total unit, making thirty-eight units in all.

Each counting unit has an individual frame 25 in which is mounted a number of rotatable thin discs 26 each provided with a toothed counting wheel 27 formed integral therewith (see Fig. 5). There is one disc and toothed wheel for each denomination and these discs and toothed wheels are carried at one end of a forked member 28 which is pivoted at 29 to the individual frame 25 of the counting unit.

Associated with each toothed wheel 27 in the set is an operating pawl 30 and all the pawls in each unit are pivoted at 31 to one end of an actuating member 32 which is itself pivoted between its ends at 33 to the individual frame 25 of the unit. Each operating pawl is provided with an L-shaped lug or projection 34 bent over to engage with the adjacent pawl in such a manner that the operation of each pawl is dependent on the operation of the preceding one. Thus the tens pawl cannot operate unless the units pawl is operated. The hundreds pawl cannot operate without the tens pawl and so on. It will, therefore, be seen that the control of the units operating pawl 30 will control the whole counting operation.

This pawl 30 associated with the units toothed wheel 27 is provided with an extension 35 adapted to engage with an obstructor 36 pivoted at 37 and normally held in engagement with the extension by means of a spring 38. The obstructor 36 is connected by means of the Bowden cable 9 to a pin 4 in the pin box 2, there being one obstructor 36 for each counting unit and consequently a corresponding number of pins in the pin box, each pin being connected by a Bowden cable to its respective obstructor.

The actuating members 32 for the pawls in all the units are all oscillated about their pivots once for each cycle of the machine, that is once for each card sensed by means which will be described later, but since the units pawl is normally maintained in an inoperative position by the obstructor 36, the oscillations of the actuating member 32 are ineffective. When, however, the obstructor 36 is actuated through its Bowden cable 9 by means of a sensing pin 4, the obstructor 36 is withdrawn from the extension 35 of the units pawl 30, and at the next oscillation of the actuating member the units pawl is permitted to engage with the units toothed wheel 27 so that the units toothed wheel and the counting disc 26 associated therewith are moved forward one tooth.

The operating pawls 30 for the wheels 27 of higher denomination than the units are provided with projections 40 (Fig. 6) which normally rest upon the periphery of the counting disc 26 of next lower denomination, so that the pawls 30 are held out of engagement with their respective toothed wheels 27. Each counting disc 26, however, is provided with a recess 41 corresponding to the nine position of the associated toothed wheel 27. Consequently, after the units disc 26 has made nine-tenths of a revolution, the projection 40 on the tens pawl 30 falls into the recess 41 in the units disc, whereby the tens pawl is brought into operative relation with the tens toothed wheel 27. Consequently, at the next oscillation of the actuating member 32 for the pawls 30, provided that the obstructor 36 is also operated, both the tens and units pawls are operated to turn their respective toothed wheels through the space of one tooth, whereby a carry-over is effected.

Similarly the hundreds pawl 30 and pawls of higher denominations have projections 40 (Fig. 6) which rest on the peripheries of the discs 26 of next lower denomination and when any disc has made nine-tenths of a revolution the projection on its pawl is in position to drop into the recess 41 so that when the preceding pawls operate the projection drops into the recess and moves its toothed wheel forward one tooth space at the next effective stroke of the actuating member, whereby a carry-over from one toothed wheel to the next is effected.

Each of the toothed wheels 27 is provided with a detent pawl 42 in order to ensure that the toothed wheel will not run back, and further in order to prevent jamming of the mechanism should any of the pawl springs 46 break, downward movement of the pawls 30 is limited by a stop member 43 on the pawl of highest denomination co-operating with the pawl comb 44 (Figs. 7 and 8).

As an additional safeguard to prevent over-running of the counting wheels 27, the units operating pawl 30 when at the end of its stroke rests on an abutment pin 45. With this arrangement the tooth next following that on which the pawl is acting comes into engagement with the upper edge 30a of the pawl and since the pawl cannot move downwardly owing to the abutment pin which is beneath it, the pawl 30 itself acts as a stop to prevent over-running.

The actuating pawls 30 are provided with springs 46 (Fig. 5) which tend to maintain them in their operative position and further the obstructor 36 is also provided with a spring 38 which tends to maintain it in the position in which it obstructs the action of the pawls 30.

*Printing wheel structure*

Mounted in the individual frame 25 above the counting discs and toothed wheels is a series of printing wheels or discs 48, there being one such wheel for each toothed wheel 27 in the counting unit. On the upper part of their periphery these printing wheels are provided with numeral type 49 and on the lower part of their periphery they are provided with teeth 50.

As previously explained the toothed wheels 27 and discs 26 of the counting mechanism are mounted in a pivoted forked member 28 and the arrangement of this member is such that when required the toothed wheels 27 in the counting unit can be swung into operative engagement with the teeth 50 on the printing wheels 48. Normally, however, the toothed wheels of the counting unit are maintained clear of the teeth on the printing wheels so that the latter are not moved during the counting operation.

Springs 51 are provided, acting upon the printing wheels and tending to turn them away from their zero position as far as possible, but the printing wheels are normally prevented from moving under the action of the springs 51 by a restoring bar 52 which engages with fingers 53 projecting from the peripheries of the printing wheels. The springs 51 may be of any desired form and may be connected to the printing wheels in any desired way, but preferably helical springs are used which act on connecting rods 54 pivoted to the printing wheels at a point 55 radially spaced from their centres 56, these connecting rods being so shaped that they not only clear the type of the printing wheels, but also the spindle about which the latter revolve.

As already stated the toothed wheels 27 in the counting unit are normally maintained clear of the teeth 50 of the printing wheels 48 during a counting operation. When, however, it is desired to take a printed record of the particulars stored up in the counting mechanism, the toothed wheels of the counting unit are swung into operative engagement with the teeth on the printing wheels and the restoring bar 52 is freed or removed from the projecting fingers 53 on the printing wheels 48. The springs 51 connected to the latter accordingly are free to rotate the printing wheels 48 away from their zero positions and since these wheels are in engagement with the toothed wheels 27 of the counting mechanism the latter are rotated towards their zero position. Therefore, the counters are restored to zero during the operation of setting the printing wheels.

It will, therefore, be seen that if the toothed wheels 27 are rotated back to their zero positions, the printing wheels 48 will have moved forward so as to be set to the number indicated on the counting wheels 27. Hence a stop pawl 57 is provided for each toothed counting wheel to check it in the zero position. These stop pawls 57 are pivoted to the individual frames 25 of the units between their ends at 58 and each is provided with a spring 59 at one end which tends to bring the other end of the pawl 57 to bear against the periphery of its respective counting disc 26. When, however, the counting wheels 27 are in the counting position, that is to say, out of engagement with the printing wheels 48, the abutment pin 45 bears against the stop pawls 57 and holds them out of contact with the peripheries of the discs.

The movement of the forked member 28 to bring the counting wheels 27 into engagement with the printing wheels 48 removes this pin 45 from the stop pawls 57 and permits them to bear against the peripheries of their respective discs 26 under the action of their springs 59. With the stop pawls 57 in this position, the restoring bar 52 is removed in order to release the printing wheels 48 and the latter revolve, thereby rotating the counting wheels 27 towards their zero positions.

As soon as the recess 41 in any of the discs 26 in the counting unit reaches the stop pawl 57 associated therewith, the latter drops into the recess and prevents further movement of the counting discs and consequently of the printing wheels 48. Thus if the unit counting disc had during a counting operation moved forward five teeth, so that its position corresponds to the numeral 5, the printing wheel associated therewith will only be permitted to move forward to the five position, at which position the stop pawl 57 will drop into the recess 41 in the disc and prevent further movement. Thus the units printing wheel will be set to print the numeral 5.

The operation of the various parts of the printing and counting mechanisms according to the invention from the source of power for the machine will now be described.

Counter system

In using the machine to which the invention is now described as being applied, the cards are punched for example in a field of three columns, so that there are three columns 3, of sensing pins 4 and therefore, three banks of counters and since there is a counting and printing unit for each pin, there are twelve counting and printing units for each bank. In addition there is a sub-total unit 60 (Fig. 30) and a grand total unit 61 (Fig. 31) both of which are operated each time a card passes through the machine making thirty-eight units in all. The three columns of pins 4 are mounted in frames 3, which are adjustable in the pin box 2 as already described, so that they can be placed over any column on the card. Consequently, counting can be effected in three columns on the cards simultaneously and in addition sorting can be effected on any of these three columns in accordance with the setting of the lower plunger bed 23, previously referred to.

Figure 1B:
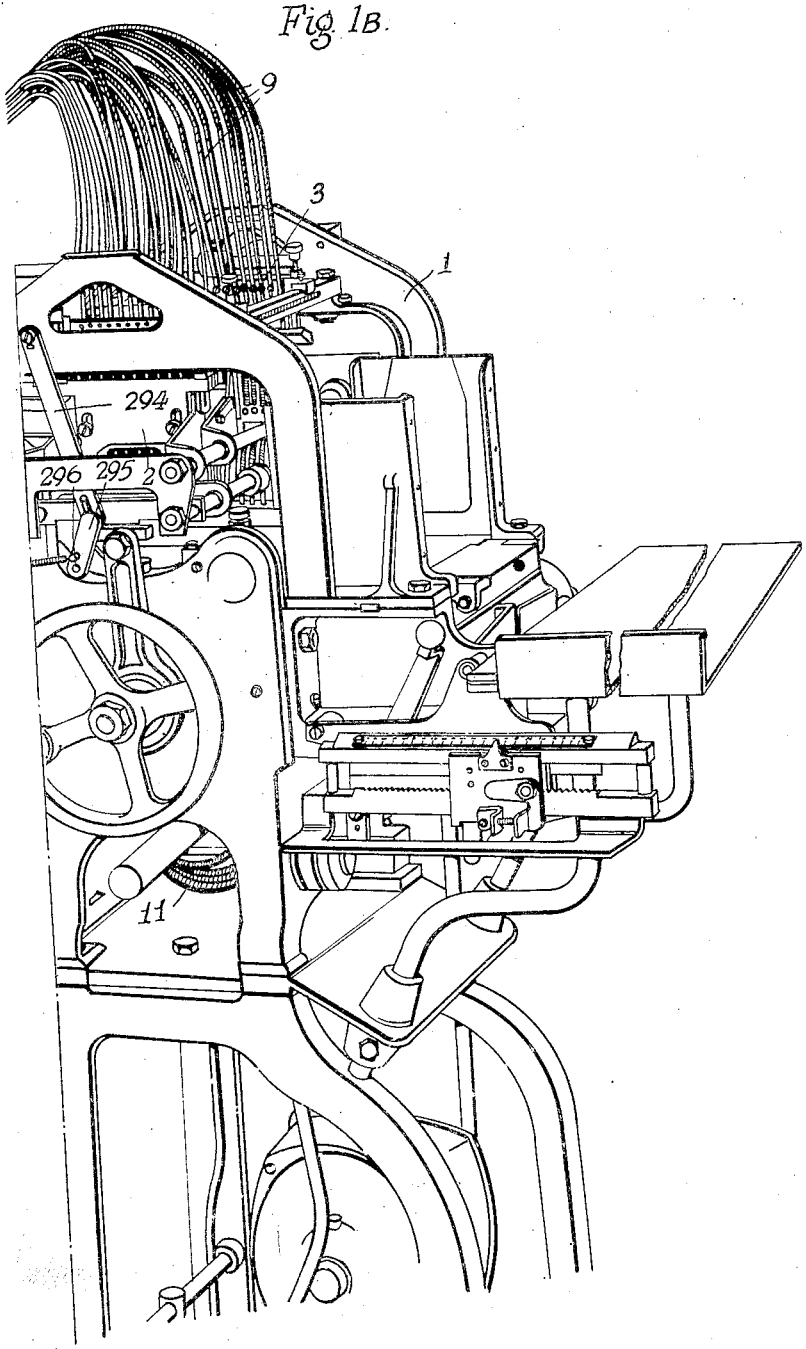

Owing to the fact that these counting and printing units occupy relatively little space as regards their width, they can be placed side by side in the machine so that there are thirty-eight units in one row in the machine (Fig. 1A).

As previously described each of these units according to the invention has an obstructor 36 and an actuating member 32 for the operating pawls 30 of the counting wheels 27, and each obstructor is connected to a sensing pin through a Bowden cable 9 (Fig. 5).

The actuating members 32 for the pawls all project in the same plane from their respective counters, and the end of each actuating member is forked as at 32a to receive a rod 62 (Figs. 5, 14, 18, 30, and 31) which is oscillated by the machine and consequently causes all the actuating members to oscillate simultaneously.

In the construction now being described, there is such an oscillating operating rod 62 for each bank and the three operating rods are carried on arms 63 (Fig. 18) secured to a spindle 64 running the length of the machine. At the end of this spindle adjacent the pin box is secured an actuating arm 65 (Figs. 9, 10, 14, and 15) which carries pivoted to its free end a link 66 hanging downwardly and pivoted at its lower end 66a to a stirrup member 67. This stirrup member carries at its upper end a pin 68 which can slide in a curved slot 69 formed in an arm 70 projecting from and secured to an auxiliary shaft 71 which is oscillated from the pin box 2 itself through a lever 72 and a link 73.

The lower end of the stirrup member 67 is held in position by means of a link 74 pivoted thereto conveniently at the point 66a and pivoted at its other end to spindle 82 a fixed part of the machine.

In order to guide the stirrup member 67 in its vertical reciprocation, its lower end is provided with a pin 75 adapted to slide in a guide member 76 fixed to the machine frame.

In order to move the pin 68 of the stirrup member 67 to one end or the other of the curved slot 69, a control handle 77 is provided mounted on a spindle 78 carrying a pulley 79 connected by a belt 80 to a second pulley 81 on a spindle 82. Preferably the belt 80 is in the form of a metal band screwed to the pulleys in order to give a positive drive.

It will be understood that the control handle 77 may well be mounted directly on the spindle 82, but in order to enable the handle 77 to be placed in an accessible part of the machine the pulley and belt connection is employed.

The control handle 77 has two positions, (1) the counting position (Fig. 14) and (2) the printing position, the handle being shown in the printing position in Figs. 9, 12 (full lines) and 15. When the handle is in the printing position the pin 68 on the stirrup member 67 is in that end of the slot 69 which is adjacent the auxiliary shaft 71. Consequently, oscillations of the auxiliary shaft 71 and of the slotted arm 70 attached thereto do not affect the stirrup member 67. Consequently, the actuating arm 65 remains substantially stationary with the pawls 30 withdrawn from the wheels 27 and the operating arm 63 with the actuating members 32 of the pawl 30 is not operated. When, however, the handle is moved over to the left in Fig. 9 the pin 68 is moved to the outer end of the slot 69 of the stirrup member 67 (Fig. 10 position) and then partakes to the fullest extent of the movement of the slotted arm 70 and is reciprocated vertically. This vertical reciprocation of the stirrup member is transmitted through the link 66 and actuating arm 65 to the operating spindle 64 for the actuating rods 62 of the pawl operating members, 32. Consequently, the pawl operating members 32 are all operated simultaneously.

In order to transmit the movement of the handle 77 to the stirrup member 67, a control lever 83 is secured to the spindle 82 and to this control lever is pivoted at a point 84 a link 85 which is pivoted at its other end at 86 to the stirrup member 67.

If, therefore, the machine is set in operation, but no cards are passed therethrough and the stirrup member 67 is brought into a position in which its pin 68 is in the outermost end of the slot 69, all the operating members 32 for the pawls 30 will be oscillated, but no pawls will be effective, since all the obstructor arms 36 are in a position to prevent operation of the pawls. When, however, a card passes through the machine having a hole disposed in a column on which one of the columns of pins 4 is set, the pin 4 corresponding to that hole will pass through the hole in the card and will actuate the respective Bowden cable, thereby withdrawing the obstructor 36 from the extension 35 on the units pawl 30 of the corresponding counting and printing unit.

At the next oscillation of all the actuating members 32 for the pawls 30, all the pawls except that corresponding to the pin 4 which has passed through the hole in the card, will be inoperative as before, but in the unit in which the obstructor 36 has been withdrawn from the extension 35 on the units pawl 30, the units pawl will be operated by its actuating member 32 and will move the units toothed wheel 27 forward one tooth, so that one is added to the number stored in that unit.

Printing wheel actuation

When it is desired to set the printing wheels 48 in accordance with the number stored up in their respective counting units, the toothed wheels 27 of the counters are brought into engagement with the teeth 50 on the printing wheels and the latter are released and allowed to rotate the counting wheels back to zero in the manner already described, whereby the printing wheels are set.

The means for bringing the counting wheels into engagement with the printing wheels and for releasing the printing wheels will now be described.

In each bank of printing and counting units the forked members 28 which carry the toothed counting wheels and discs project in the same plane and their projecting ends are slotted at 28a to receive an actuating bar 87 (Figs. 16 and 18). There is thus an actuating bar 87 for each bank and each actuating bar is oscillated from a pair of cams 88. The pair of cams 88 for each actuating bar are mounted on a hollow sleeve 89 and through the three hollow sleeves 89 runs a common main actuating shaft 90 to which one or more of the sleeves can be clutched at will. In Fig. 16 only one cam 88 of the pair is shown for the sleeve 89, the other cam being identical with the one illustrated. This actuating shaft is caused to rotate through one revolution by means of a one revolution clutch which connects it to a constantly rotating member driven by an electric motor. This clutch and the means for controlling it will be described later.

Each cam in a pair has a hook shaped connecting rod 91 (Fig. 18) which partially encircles its respective cam and carries two rollers 92 which engage with the cam at points 180° apart, the distance between the rollers and the sleeve 89 carrying the cams being such that when one roller is on the active surface of its respective cam the other roller is on the boss of the cam. The free ends of the hook shaped connecting rods 91 are turned over as at 93 and each pair carries an actuating bar 87 previously referred to, which engages with the forked members 28. Thus as the cams revolve, these actuating bars 87 are oscillated.

Formed on each of the sleeves 89 are gear teeth 94 (Fig. 16) meshing with a gear wheel 95 on an adjacent shaft 96. This shaft serves to operate the restoring bars 52 for the printing wheels 48 and for this purpose the shaft 96 of each bank carries a crank disc 97 at each end connected by means of a link 98 to an arm 99 pivoted on the same axis 56 as that about which the printing wheels 48 revolve. The arms 99 at each end of the bank of counting units carry the restoring bar 52 which extends from one to the other.

The gear ratio between the sleeve 89 and the shaft 96 is 1:1, so that when the sleeve 89 makes one revolution the shaft 96 also makes one revolution. The one revolution thus imparted to the disc 97 causes the arms 99 to rock and move the restoring bars away from the fingers 53 on the printing discs 48, thereby allowing the springs 51 to rotate the discs as far as is permitted by the counting wheels 27. The final part of the rotation of the discs 97 brings the restoring bar back to its normal position in which the printing discs 48 are held against movement under the action of the springs 51.

The setting of the point of attachment 98a of the link 98 to the disc 97 and of the cam 88 on the sleeve 89 are so co-related that when the sleeve 89 makes its one revolution the toothed counting wheels 27 are first brought into engagement with the printing wheels and then the restoring bars are rocked to free the printing wheels, whereby the counting wheels are zeroized. The counting wheels are then brought out of engagement with the printing wheels and the restoring bar is finally returned to normal position. Further the arrangement is such that the counting wheels 27 are brought into engagement with the printing wheels 48 when the latter are at zero.

Preferably means is provided for throwing out of operation one or more banks of counters and to this end means is provided for disengaging the sleeve 89 for any of the banks from the driving shaft 90.

To this end the sleeve 89 is connected to a clutch disc 100 by means of dogs 101 (Fig. 17A) and the shaft 90 carries a sleeve 102 attached to it by a set screw 103 and having a collar 104 in which is formed a notch 105. Pivoted on the clutch disc at 106 is a pawl 107 of which the end is hooked at 108 and is normally maintained in engagement with the notch 105 by means of a spring 109, whereby the sleeve 89 is normally clutched to the shaft 90.

In order to disengage the clutch and thereby throw out of operation the restoring bar 52 and the means for bringing the counting wheels in any bank into engagement with the printing discs, a trip member 110 (Figs. 16 and 17) is provided pivoted at 111 to a bracket 112 fixed to the machine frame. The trip member 110 has a nose 113 adapted to engage with the tail 107a of the pawl 107 and turn the pawl about its pivot 106 to disengage the hooked end 108 of the pawl from the notch 105 in the collar 104. In order to operate the trip 110 a handle 114 is provided pivoted to the bracket 112 at 115 and having at one end a slot 116 engaging with a pin 117 carried on the free end of the trip member 110. The slot 116 is so shaped that when the handle 114 is in the down position as indicated in Fig. 17 the nose 113 of the trip member 110 is held out of engagement with the tail 107a of the clutch pawl 107. When, however, the handle 114 is moved upwardly the curvature of the slot coacting with the pin 117 causes the trip member 110 to turn in an anti-clockwise direction about its pivot 111, whereupon the nose 113 engages with the tail 107a of the pawl 107 and turns it so as to bring the hooked end 108 out of engagement with the notch 105, whereby the sleeve 89 is declutched from the shaft 90.

In order to ensure that the disconnected portion of the shaft is correctly held in location, there it cut in the periphery of the clutch disc 100 a recess 118 into which the trip member 110 enters before it operates on the pawl 107, the trip member being wide enough to engage both in the slot and with the pawl 107. Thus when the trip member 110 is moved into position to disengage the pawl 107 it first engages with the recess 118 in the clutch disc 100 and locks the disc against movement. In addition a ratchet pawl 119 is provided to prevent the disc 100 from being rotated counter-clockwise when the machine is not running and the member 110 has raised pawl 107 and then been withdrawn.

In order to locate the handle 114 definitely in its up or down position, the handle is provided with a pin 120 running in a slot 121 in the bracket 112 and a spring 122 is attached to this pin at one end and to the bracket at the other end as shown in Fig. 17.

In order to provide a single control member for controlling both the printing mechanism and the counting mechanism, the control handle 77 (Fig. 9) which operates the stirrup member 67 to determine whether the actuating members 32 for counting units shall be oscillated or not is also connected up to the one revolution clutch serving to connect the shaft 90 to an electric motor for operating the mechanism for bringing the counting wheels into engagement with the printing discs and for operating the restoring bar.

To this end the control member 83 mounted on the spindle 82 carries a laterally projecting pin 123 (Figs. 9, 10, 12, 14, and 15) adapted when the control member 83 is brought into the printing position to depress a bell crank 124 pivoted at 125 and having a turned over end 126 with which the pin 123 engages. Thus when the control member 83 is brought into the printing position the pin 123 thereon depresses the end 126 of the bell crank 124, thereby turning the bell crank 124 about its pivot in an anti-clockwise direction whereby a rod 127 to which the bell crank 124 is pivoted is pulled to the right in Fig. 12. The other end of the rod 127 which extends the length of the machine is pivoted at 128 to one arm of what may be termed a scissors device, which normally holds the one revolution clutch out of engagement. This scissors device comprises one long arm 129 to which is pivoted the rod 127, the lower end of this arm being pivoted to a fixed part of the machine by means of a pin and slot connection 130. A spring 129a attached to the arm 129 by pivot 132 and to a fixed part of the machine tends to pull the arm 129 downwardly. The upper end of the arm is provided with a lateral projection 131 and the arm also carries pivoted to it at 132 a second shorter arm 133 which is offset from the long arm and carries a lateral projection 134, which normally abuts against the lateral projection 131 of the long arm and is held in contact therewith by means of a spring 135. The long arm 129 is normally held over to the left in Fig. 12 by means of a spring 136.

The one revolution clutch comprises a disc 137 secured to the shaft 90 and carrying pivoted to it on a pin 138 a pawl 139 tending to be held in engagement by means of a spring 140 with teeth on a driving member 141 which is constantly rotated from an electric motor through a gear wheel 142 and worm gear 142a (Figs. 1, 1A, and 15).

Normally the scissors members 129 and 133 are closed and pulled over to the left by the spring 136 so that the ends of the projections 131 and 134 abut and the lower edge of the projection 131 holds a tail 143 of the pawl 139 in such a position that the nose of the pawl remains out of engagement with the teeth on the driving member 141. The construction of the two projections 131 and 134 of the scissors device is such that their lower edges do not form a continuous straight line, but there is a shoulder 144 formed at the point where they meet.

The tail 143 of the clutch pawl normally rests against the under edge of the projection 131 on the longer arm and since the lower edge of the projection 134 of the shorter arm is lower than the lower edge of the projection 131, the end face or shoulder 144 on the shorter arm abuts against the side of the tail 143 of the clutch pawl (Fig. 13).

When the rod 127 is pulled to the right by operation of the handle 77 as previously described, the arm 129 of the scissors device is turned in a clockwise direction about its pivot 130 so that its projection 131 moves away from the tail 143 of the clutch pawl. The two arms 133 and 129 are connected by the spring 135, so that the shorter arm 133 tends to follow the movement of the longer arm 129, but is prevented from doing so by reason of the fact that the end face or shoulder 144 on the projection 134 on the shorter arm abuts against the tail 143 of the pawl. Thus when the longer arm 129 has been withdrawn, the pawl 134 can escape between the projections 131 and 134 and is pulled by means of its spring 140 into engagement with the teeth on the member 141 (Fig. 13A), whereby the disc 137 and shaft 90 are rotated. As soon as the pawl 139 leaves the scissors device, the projection 134 of the shorter arm snaps up against the projection 131 of the longer arm and when the clutch disc 137 has made one revolution the tail 143 of the clutch pawl strikes the lower edge of the projection 134 on the shorter arm 133 which has now moved into its path by the operation of the rod 127. The driving force (or friction) between the clutch dog 139 and the driving member causes the spring 129a to be extended until the end of the slot 130 reaches the pin, when the clutch dog 139 is positively pulled out of engagement by its own driving power. The shaft is then prevented from running back by a ratchet 90a and pawl 90b, while the spring 129a (being very much heavier than the spring 140) pulls downward the arm 129 and draws the dog 139 outwards until the stop pin 139x is reached, when the spring 129a then exercises a pressure tending to rotate the shaft in a clockwise direction (Fig. 13A) and thus hold it in a definite position, located by the ratchet and pawl 90a and 90b.

A guide 145 fixed to the frame of the machine is provided to maintain the scissors device in a vertical plane.

In order to prevent the release of the clutch pawl 139 by direct operation of the scissors device the end of the rod 127 which is pivoted to the bell crank 124, is formed with a shoulder 146 adapted to engage with the hooked end 147 of a latch 148 pivoted at 149 to a depending support member 150 and normally pulled upwards by means of a spring 151, so as to prevent movement of the operating rod 127 (see Fig. 12).

In order to release the latch 148 the said latch is pivoted to the lower end of a link 152 of which the upper end is turned over at 153 adjacent to the turned over end 126 so that as the pin 123 on the control member 83 descends, the said pin first depresses the link 152 and releases the latch 148 and then rocks the bell crank 124 to operate the rod 127 as previously described.

Means is also provided for holding the control member 83 and handle 77 in the printing position until the shaft 90 has made one revolution, and to this end a latch 154 is provided under which the pin 123 of the member 83 moves when the member 83 is brought into the printing position.

The shaft 90 carries a cam 155 serving to operate zeroizing mechanism for the grand total counter, as will be hereinafter described, and in order to release the latch 154 at the end of one revolution of the shaft 90 the cam 155 is provided with a projecting stud 156 which towards the end of the one revolution which controls the printing action turns a lever 157 secured to a shaft 158 on which the latch 154 is mounted. Thereby the latch is removed from the pin 123.

In order that the latch 154 shall not drop back and re-latch the member 83 before the latter has left the printing position, the latch 154 (Fig. 11) carries pivoted to it an auxiliary latch 159 adapted to engage with a projection 160 on the frame of the machine.

When the main latch 154 is freed from the pin 123, the auxiliary latch 159 engages with the projection 160 and holds the main latch 154 out of engagement with the pin 123. In order to return the main latch 154 to its operative position the pulley 81 carries a pin 161 (Figs. 10 and 12) which when the shaft 82 is turned to bring the member 83 from the printing to the counting position, raises the auxiliary latch 159 clear of the projection 160, whereupon a spring 162 attached to the lever 157 returns the main latch 154 to its operative position. Thus during a printing operation the control member 83 and the handle 77 are locked in the printing position, but as soon as the printing operation is completed, these members are free to move back to the counting position.

On moving the control member 83 back to the counting position the latch 148 for the clutch operating rod 127 is first allowed to rise under the action of its spring 151 and then the scissors device and operating rod 127 are returned to their original position by means of the spring 136 attached to the arm 129, whereupon the rod 127 is latched by the latch 148, so that the clutch pawl cannot be released by direct operation of the scissors device.

In order to ensure that the counting wheels 27 pick up their correct relative positions with respect to the teeth 50 on the printing discs 48 after a printing operation and before another printing operation can be performed, mechanism is provided by means of which the control member 83 is locked after it has been brought back into the counting position until the machine has made a predetermined number of revolutions, for example three. Thus when the member 83 has been brought back from the printing position to the counting position, it cannot be immediately returned to the printing position but is locked in the counting position until the predetermined number of revolutions has been performed and the counting wheels are definitely positioned correctly with regard to the teeth of the printing discs.

In addition means are provided for ensuring that the control member 83 once it has left the printing position cannot be returned thereto without first having been moved right over into the counting position and left there until the machine has completed the predetermined number of revolutions referred to above.

*Lock out mechanism*

To this end a full stroke pawl 163 is pivoted to the control member 83, preferably co-axially with the pin 123 (Figs. 9, 10, and 12) in such a way that while the control member is being moved from the printing position to the counting position, the pawl 163 trails along the surface of a quadrant 164. The quadrant is provided with a notch 165 adjacent the printing position of the control member 83, and if the control member is returned towards the printing position before having been moved into the counting position, the pawl 163 will lead the control member 83 and will engage with one face of the notch 165 to prevent the control member from being moved fully into the printing position.

At the other end of the quadrant 164, that is to say, at the counting position of the control member 83, means is provided for permitting the pawl 163 to reverse its direction under the action of its spring 166, so that the control member 83 can be moved fully back into the printing position. In order, however, that the machine shall make at least three revolutions before it is possible to return the control member 83 to the printing position, means are also provided whereby the full stroke pawl 163 is prevented from reversing immediately the control member has been brought into the counting position, but is maintained in its original position (leading the control member considering the direction of movement of the control member from the counting to the printing position) and consequently, engages against a shoulder 167 formed on the quadrant 164, and prevents the control member 83 from being moved out of the counting position again until the machine has made the predetermined number of revolutions.

The end of the quadrant at which the control member 83 is disposed when in the counting position is provided with a cut-away portion 168 which would allow the full stroke pawl 163 to reverse its direction under the action of the spring 166, if it were not for the means about to be described for preventing this reversal. Adjacent the end of the quadrant 164 at which the control member 83 rests when in the counting position is the up-turned end 169 of a locking lever 170 pivoted between its ends at 171 to the frame of the machine. The up-turned end 169 is adapted to engage with the full stroke pawl 163 carried on the control member 83 in such a position that when the control member is brought into the counting position, the pawl 163 is supported on the up-turned end 169 of the locking lever 170, whereby the pawl is prevented from reversing and engages with the shoulder 167 on the quadrant if an attempt is made to move the control member 83 towards the printing position.

In order to release the control member 83 after the machine has performed the predetermined number of revolutions, the end edge of the locking lever 170 remote from the up-turned end 169 is provided with a plurality of ratchet teeth 172 adapted to be engaged by a pawl 173 pivoted at 174 to the arm 65 attached to the oscillating shaft 64 which operates the actuating pawls 30 for the counting units. The locking lever 170 occupies an approximately horizontal position and the toothed end is drawn in a downward direction by means of a spring 175, whereby the upturned end 169 is raised in readiness to engage with the pawl 163 on the control member 83. Assuming that the machine is stationary with the toothed end of the locking lever 170 in its lowermost position, then when the machine is started the pawl 173 depending from the arm 65 will engage with the teeth 172 on the lever 170 and will lift the toothed end of the said lever by the amount of one tooth for each revolution of the machine until the teeth have been raised clear of the pawl 173, which then merely reciprocates idly during the continued running of the machine.

A retaining pawl 176 pivoted at 177 to the frame of the machine is provided for holding the toothed end of the locking lever 170 in its uppermost position.

If now a pack of cards is being run through the machine, when the last card has passed through, the machine will stop automatically in a known manner and this will leave the toothed end 169 of the locking lever 170 held in its uppermost position by the retaining pawl 176. Consequently, the up-turned end 169 of the locking lever 170 will be in its lowermost position, and the control member 83 which is in its counting position, will be free to move into the printing position. The operator then moves the control member 83 into the printing position and during this movement of the said member, a projecting member 178 carried on the link 85 which connects the control member 83 to the stirrup member 67, engages with a pin 179 on the retaining pawl 176, thereby knocking both the retaining pawl 176 and the actuating pawl 173 out of engagement with the teeth 172 on the end of the locking lever 170 (the pin 179 on the retaining pawl 176 is long enough to engage with the actuating pawl 173), thereupon the locking lever 170 is reset by means of its spring 175 into a position in which its up-turned end 169 occupies its uppermost position.

After the printing operation has been completed, the operator brings the control member 77 back to the counting position once more and the pawl 163 of the member 83 is prevented from reversing by the raising of the up-turned end 169 of the locking lever 170, whereby the control member 83 is locked in the counting position.

The machine is now stationary with the control member locked in the counting position and no further printing operations can be performed until the machine has executed a sufficient number of revolutions to release the pawl 163 from the locking lever 170.

*Printing*

Disposed above the banks of printing wheels 48 is a printing ribbon 180 wound on two spools 181 and 182, disposed one at each end of the machine. This ribbon is fed by mechanism which will be described later.

A roll 183 (Fig. 18) is also provided for feeding paper between the printing ribbon 180 and the printing wheels 48 on which the type 49 are made in readable or reversed form, so that the printed result appears on that surface of the paper which is not in contact with the type. Thus not only do the type provide a visible indication of the numbers stored in the respective counting units, but also the printing ribbon does not come into contact with the type whereby they are prevented from becoming clogged.

Arranged above the printing ribbon 180 is a row of printing hammers indicated generally at 184 in Fig. 18 and illustrated in detail in Figs. 19, 20, and 21. Each of these hammers comprises a hammer member 185 pivoted at 186 to a bracket 187 on the frame of the machine and carrying an upwardly directed lug 188 through which passes a rod 189. One end of this rod is secured to a pivot pin 190 journalled in the bracket 187 at a point offset from the hinge pin 186 of the hammer 185. The hammers in each bank are raised by a bar 191 carried on two levers 192 pivoted to the frame of the machine at 193. Each of these levers is provided with an operating cam 194 secured to a shaft 195 running the length of the machine. This cam shaft 195 is connected by any well known coupling means indicated by a disc 196 and a disc 197 carried on a short shaft, having a sprocket wheel 199 on its end (Fig. 15). The short shaft is driven by means of a chain 200 embracing the sprocket wheel 199 and another sprocket wheel 201 carried on the one revolution shaft 90. Thus when the one revolution clutch 137 is engaged and the shaft 90 makes one revolution, the cam shaft 195 also makes one revolution and owing to the shape of the cam first lifts the arms 192, thereby raising the hammers 185 and then suddenly releases the hammers which are forced down on to the printing ribbon by means of their springs which are about to be described.

Each hammer is provided with a spring 202 coiled around the rod 189 between the up-turned lug 188 and the pivot pin 190. When the hammers ar raised by the bar 191 and cams 194, the rod 189 turns about its pivot 190 but as this pivot point is offset from the hinge 185 of the hammer, the lug 188 moves along the rod 189 and compresses the spring 202. Consequently when the hammer is released the spring 202 extends again and pushes the hammer forcibly down on to the printing ribbon.

In order to bring the hammers off the ribbon immediately after a blow and to hold them clear of the ribbon in an inoperative position a second spring 203 is provided coiled around the rod 189 on the side of the lug 188 away from the pivot 190, this being kept in position by means of a nut 204 placed on the end of the rod which is screw threaded to receive it. These two springs are in opposition to one another and are in equilibrium when the hammers are at rest.

The hammers are divided into three banks corresponding to the three banks of counting and printing units, there being one hammer raising bar 191 for each bank, but all the hammer raising bars are operated from a common cam shaft 195.

In order to put out of action all the hammers in one or more banks when desired, a manually operable lever 205 is provided for each bank. This lever carries a cam 206 (Fig. 20) co-operating with a fixed portion 207 of the machine frame and at the other end of the bank of hammers is a second cam 208 connected to the lever 206 by a rod 209 and co-operating with a fixed portion 207a of the frame. The two cams are pivoted on trunnions 206a, 208a having bearings in webs 210 formed on the arms 192. Normally the operating lever 205 is in the position shown in Fig. 20 and the arms 192 and the bar 191 are in a position in which they can be operated by the cams 194 when the shaft 195 revolves.

In order to put the bank of hammers out of action the lever 205 is brought into the position shown in Fig. 21 whereupon the cams 206 and 208 act upon the portions 207 and 207a of the frame of the machine, and force the arms 192 up to such an extent that the hammers cannot reach the paper. Thus when the shaft 195 rotates, the hammers remain raised and are therefore inoperative.

In order to prevent the lever 205 from slipping out of place when the arms 192 are raised by the cams 194, a plate 211 having a profile similar to that of the cam 206 is attached to the lever 205 and can slide thereon by means of guides 212. A pin 213 on the plate 211 projects through a slot 214 in the lever 205 and serves as a stop for the relative movement of the plate 211 and lever 206. A pin 215 on the lever 206 is connected by a spring 216 to a pin 211a on the plate 211 so that even when the cam 206 is raised from the member 207 the plate 211 still bears thereon. A projection 217 is provided on the cam 206 to act as a stop for the lever 205.

The control member 83 serving to throw the counting mechanism out of operation and to bring the printing mechanism into operation or vice versa, also serves to switch on the motor for operating the member 141 to which the clutch member 137 is clutched, in order to cause the shaft 90 to make one revolution. To this end the stirrup member 67 carries a long lateral pin 218 engaging in a slot 219 in a bell crank 220 pivoted at 221 to a bracket 222 fixed to the frame of the machine (see Figs. 14, 15, 22, and 23). The other end of this bell crank carries pivoted to it a link 223 pivoted to a short arm 224 secured to a shaft 225 mounted in the frame of the machine and carrying a lever 226 on which is pivoted a switch operating arm 227. The switch operating arm carries a projection 228 maintained in engagement with a pin 229 on the lever 226 by means of a spring 230. The operating lever 227 is formed with a recess 231 adapted to engage with an operating knob 232 of the tumbler switch controlling the supply of current to the electric motor, serving to drive the shaft 90 when the clutch 137 is engaged.

When the control member 83 is in the counting position the operating lever 227 is in engagement with the switch knob 232 as shown in full lines in Fig. 23, and the switch is open but when the control member is moved over into the printing position (Fig. 22), the movement of the stirrup 67 rocks the bell crank 220 in a clockwise direction about its pivot and turns the lever 226 in a clockwise direction. During the initial movement of the lever 226 the recess in the operating arm 227 is in engagement with the knob 232 and the arm 227 pulls the knob 232 over to the closed position. At this point, however, the projection 228 on the arm 227 engages with the pin 229 on the lever 226 and during the further movement of the lever 226 the operating arm 227 is lifted clear of the knob 232 into the position shown in Fig. 22 and in dotted lines in Fig. 23. On moving the control member 83 back to the counting position the arm 227 is first moved down into engagement with the knob 232 and the final movement of the lever 226 causes the arm 227 to open the switch.

*Paper feed*

Attached to the shaft 225 is a short arm 233 which is connected by means of a link 234 to the feed pawl 235 for the paper feed roll so that each time the control member 83 is moved into the printing position, the paper is fed forward one, two, three or four spaces in accordance with the setting of the feed pawl. The means for setting the feed pawl may be of any known form.

The construction of the paper feed pawl mechanism is as follows. The pawl 235 (Fig. 24) is pivoted on a plate 236 which is mounted on the feed roll shaft 237. The plate 236 is forked at 238 and this fork engages with a pin 239a on an arm 239 attached to a shaft 240 carrying a second arm 241 to which the link 234 is connected. A detent pawl 235a is also provided for the paper feed ratchet.

In addition there is secured to the shaft 225 another short arm 242 (Figs. 25, 26, 27, 28, and 29), which operates the pawl for the ribbon feed mechanism, so that when the control member 83 is brought from the counting to the printing position, the ribbon is fed forward by one stroke.

*Ribbon feed*

The ribbon feed mechanism, which forms the subject matter of my U. S. Patent No. 1,897,084, comprises two spools 181 and 182 respectively secured to shafts 244 and 245.

Three brackets 246, 247, and 248 are provided forming part of a unit frame construction 249 and the bracket 247 forms a bearing for a sleeve 250 carrying a feed ratchet 251 (Figs. 25, 26, and 27). The sleeve 250 constitutes a bearing for the meeting ends of the two shafts 244 and 245. On the sleeve 250 adjacent the ratchet 251 is freely mounted a plate 252 (Fig. 27) carrying the feed pawl 253. The plate 252 is forked at 254 and this fork engages with a pin 242a on the arm 242 (Fig. 29) carried on the shaft 225 which is rocked by movement transmitted from the control member 83 through the link 223. The arrangement of the pawl 253 on the plate 252 is such that when the shaft 225 turns in a clockwise direction the pawl makes its feeding stroke. A detent pawl 253a is also provided for the ratchet 251.

The sleeve 250 has fastened to its ends two collars 257 and 258 provided with dog teeth 259 and 260 respectively (Fig. 28). On the shaft 244 is mounted a clutch member 261 which is free to slide on the shaft 244 and carries a clutch key 262 engaging in a slot 263 formed in a collar 264 secured to the shaft 244. The clutch member 261 can be moved along the shaft 244 (Fig. 26) by means of an arm 265 engaging with a groove 266 in the clutch member 261 and attached to a sliding reversing shaft 267. When the clutch member 261 is moved to the right in Fig. 28 the key 262 engages not only with the slot 263 in the collar 264, but also with one of the dog teeth 259 whereby the ratchet 251 is clutched to the collar 264 and consequently to the shaft 244. Hence as the ratchet is turned the spool 181 attached to the shaft 244 will be turned.

Adjacent the dog teeth 260 the shaft 245 carries a sliding clutch member 268 similar to the member 261 and having a clutch key 269 engaging in a groove 270 in a collar 271 secured to the shaft 245. The clutch member 268 is controlled by an arm 272 secured to the reversing shaft 267 in such a way that just prior to when the key 262 engages with the dog teeth 259 the key 269 is drawn out of engagement with the dog teeth 260 and vice versa.

When the shaft 267 is moved longitudinally to the right in Fig. 26 the clutch key 262 is moved into engagement with one of the dog teeth 259 whereby the shaft 244 and spool 181 are clutched to the ratchet wheel 251 and are, therefore, driven by the pawl 253. On the other hand the clutch key 269 is withdrawn from engagement with the dog teeth 260, so that the shaft 245 and spool 182 are disengaged from the ratchet wheel 251. The ribbon is, therefore, wound on to the spool 181 and off the spool 182.

If the shaft 267 is moved to the left in Fig. 26 the shaft 244 is disengaged from the ratchet wheel 251 and the shaft 245 is clutched thereto so that the ribbon is fed in the opposite direction. In order to effect this reversal or movement of the shaft 267, the said shaft carries two collars 273 between which lies a reversing arm 274 carried on a short spindle 275 to the other end of which is fixed a cross bar 276 carrying at each end depending pivoted hook members 277 and 278. Secured to the rocking shaft 225 is a forked member 279 having arms 279a and 279b adapted to engage respectively with the depending hook members 277 and 278.

The hook members are connected together by a spring 280 and their lateral position is controlled by a bracket 281 attached to a connecting rod 282 pivoted at one end to a bell crank 283 and at the other end to a bell crank 284, the two bellcranks being pivoted to the frame of the machine. A movement of either bell crank will move one of the hook members into engagement with one of the arms 279a and 279b and the other out of engagement. The ribbon is attached at one end to a pin 285 mounted on an arm 286 which is pivoted to the spool 181 and at the other end to a similar pin and arm carried by the spool 182. The two pins project through slots 287 in the sides of the spools.

Assuming that the ribbon is wound on to the spool 181, the pin 285 will be locked near the centre of the spool and will, therefore, pass under a lug 283a on the bell crank as the spool revolves. When the ribbon becomes entirely unwound it will pull the pin out to the end of the slot 287. The movement of the pin 285 thus caused by the ribbon will bring the pin outwards into a position where it will engage the lug 283a of the bell crank 283 and as the spool turns this bell crank will be turned about its pivot in a clockwise direction, thereby moving the connecting rod 282 to the right in Fig. 26. This movement of the connecting rod will move the hook members, so as to bring the hook member 277 into such a position that its hooked end is directly below the arm 279a of the shaft 225. This motion takes place on a feeding stroke of the ribbon, then at the return stroke of the pawl 253 the movement of the shaft 225 causes the finger 279a to pull the hook member 277 downwardly, thereby turning the cross bar 276 still further about its pivot, whereby the reversing arm 274 is turned in an anti-clockwise direction and moves the reversing shaft 267 to the right in Fig. 26, thereby causing the clutch key 262 to engage with the teeth 259 and the clutch key 269 to become disengaged from the teeth 260.

A manually operable handle 288 is pivoted to the frame at 289 and also to the arm 272 so that by movement of the handle 288 the shaft 267 may be reciprocated and the clutches engaged and disengaged.

*Sub and grand totalizers*

The arrangement and operation of the total counting and printing units will now be described.

It will be appreciated that the total counters count the cards as distinct from the holes in the cards. Thus a check can be obtained from which errors in punching or omitted holes are discovered.

The sensing mechanism in this apparatus is similar to that described in British specification No. 328,294 of April 22, 1930, but in the machine here described the connection to the total counting units is made by a Bowden wire.

There are actually two total counters provided as indicated at 60 and 61 in Fig. 1A, and the obstructor arms 36 of these counters are coupled together so that they count together. One total counter is used to record the total of the cards passed through the machine in any one counting operation, while the second is available to carry on a record of the grand total of a number of counting operations.

The coupled obstructors of the two total counters are connected by a Bowden wire 290 to an arm 291 secured to a rocking shaft 292 mounted in the frame of the machine adjacent the pin box 2 (see Fig. 2).

The shaft 292 also carries a second arm 293 pivoted to a link 294. The link 294 is connected by a pin and slot connection to an arm 295 pivoted to the frame of the machine at 296. Carried on the pin box is a projection 299 adapted to engage with a projection 300 on the link 294 when the pin box descends, thereby rocking the shaft 292 and actuating the obstructors for the total counters. Mounted on the pivot 296 so as to turn with the arm 295 is a bent finger 297 adapted to co-operate with a "no card" pin 298 in the pin box. When there is no card in the pin box the pin 298 is taken downwards by its spring and the finger 297 is thereby pressed down, rocking the arm 295 in a clockwise direction so that the projection 300 is brought clear of the projection 299 and the obstructors are not actuated.

Each time the pin box descends and a card is between the pin plates the link 294 remains in contact with the projection 299 and consequently during the descent of the pin box the projection 299 thereon engages with the projection 300 on the link 294 and pulls the link downwardly thereby operating the obstructors for the total counters.

The printing and restoring mechanism of these total counters is arranged in a manner different from that of the other counters, in that whereas these other counters (which count holes in the cards) are restored to zero at each printing operation, the total counters may be prevented from zeroizing, so that the total counters may accumulate.

The operation of the total counters to print and restore is as follows:

The counting wheels 27 in the positions to which they have been turned during a counting operation, are moved into engagement with the type elements 60 or 61 when these are held in zero position. The restoring bar is then moved away, allowing the springs to move the type members and through them the wheels 27 until the wheels are stopped by their zero pawls 57 engaging with the notch 41 in the carry-over disc 26. With the type members in this position the hammers are operated. So far the operation is the same as with the "hole" counters, but with these latter counters the counting wheels 27 which are in zero position are then brought out of engagement by means of their cams 88 and the type members are restored to zero independently. Thus the counters are again in their zero positions.

In the case of the total counters the operation is the same until the print has been made, but then instead of the counting mechanism being disengaged from the type wheels, they are left in engagement so that the restoring action of the type members returns the counters through the same number of spaces as that through which they had previously advanced, thus putting back on to the counting wheels the amount printed.

In order to effect this operation in the case of the sub-total counter, the counting wheels 27 and discs 26 are carried in a bar member 301 (Fig. 30) similar to the member 28 carrying the counting wheels of the ordinary or "hole" counter, except for the fact that this bar member 301 instead of being forked at its free end is shaped as at 302 and the upper surface of this shaped portion is maintained in engagement with the operating bar 87 by means of a spring 303. Thus the counting wheels 27 are moved into engagement with the sub-total printing wheels 60 of the sub-total counter by means of the bar 87 operated by the cam 88, but are not disengaged thereby.

The disengagement is effected by means of the spring 303. A latch 304 pivoted at 305 is provided which is adapted to engage with the hook shaped portion 302 of the bar 301 and hold this member in the position in which the toothed wheels 27 are in engagement with the teeth 59 on the printing wheels 48. The tail 306 of the latch 304 carries a roll 307 adapted to co-operate with a cam 308 mounted on the one revolution shaft 90 and at each revolution of the shaft 90 the cam 308 is caused to rotate and engages with the roll 307, thereby freeing the end 302 of the lever 301 from the latch 304. The spring 303 then turns the lever 301 about its pivot and brings the counting wheels 27 out of engagement with the printing wheels 60. This movement of the bar 301 ceases when its end 302 comes into contact with the bar 87.

In addition, a hand lever 309 may be provided, freely mounted on the shaft 90 and carrying a cam portion 310 which, when the lever 309 is raised, engages with the tail 306 of the latch 304, thereby holding it permanently out of engagement with the end of the bar 301. By this means the sub-total counting unit may be caused to zeroize together with the outer counters.

The counting wheels 27 of the grand total unit are carried in a bar 312 (Fig. 31) formed in the same way as the bar 301 carrying the sub-total counting wheels, and a latch member 313 pivoted at 314 is provided serving to engage the end 315 of the bar member 312 and hold it in a position in which the counting and printing wheels are in engagement with one another. Thus, when the operating bar 87 is withdrawn upwardly into its normal position, the grand total counting wheels 27 remain in engagement with the printing wheels 48 until the latter are zeroized.

In order to release the latch 313 when it is desired to clear the grand total counting unit a cam 155 is mounted on the shaft 90 and engages with a roll 316 carried on the latch member 313, (this being the cam previously referred to as carrying a projecting stud 156 serving to release the latch 154 for the control member 83) whereby when the shaft 90 rotates the cam 155 engages with the roll 316 and releases the latch.

The grand total counter, being the means whereby the total figures are recorded, is only zeroized when required. In order to prevent any possibility of zeroizing incorrectly owing to an operator's failure to reset the control, this control is so arranged that it resets itself after being operated. This control comprises a latch 317 pivoted to the frame of the machine at 318 having a curved surface 319 and a shoulder 320 at one end. The outer end of the latch member 317 projects through the casing of the machine and carries a plate 321 bearing on its upper end the word "Add" and at its lower end the word "Clear", whereby an indication is given as to the setting of the grand total counting unit.

The latch 313 is provided with a handle 322 which, when in the position shown in Fig. 31, permits the latch 313 to engage with the end 315 of the bar 312, whereby the grand total unit is caused to accumulate. When it is desired to zeroize the grand total unit the handle 322 is depressed, thereby bringing the latch 313 clear of the bar 312. The lower end of the latch 313 carries a shoulder 323 which normally engages with the curved surface 319 of the latch 317.

When the handle 322 is depressed the shoulder 323 is moved clear of the curved surface 319, whereupon the latch 317 is turned about its pivot 318 by means of a spring 324 anchored at 325 to the frame of the machine. The spring 324 turns the latch 317 about its pivot until the shoulder 320 on the latch 317 strikes the shoulder 323 on the latch 313. This movement of the latch 317 brings the word "Clear" on the plate 321 into a position opposite a window in the casing so as to indicate that the grand total counter is set to zeroize at the next printing and clearing cycle.

The operation of zeroizing the grand total counter is as follows:

The bar 87 moves the bar 312 about its pivot in a counter clockwise direction, thereby bringing the counting wheels 27 into engagement with the grand total printing wheels 61. The latter are then moved until the counting wheels are zeroized and the bar 87 is then retracted, whereupon the bar 312 follows the movement of the bar 87 under the action of its spring 311, thereby bringing the counting wheels 27 out of engagement with the printing wheels before the latter are zeroized, so that the counting wheels themselves remain zeroized. The cam 155 comes round as usual as the shaft revolves, but is idle since the roll 316 is out of range of the cam 155.

The cam 155 carries a stud 326 which, when the shaft makes its rotation (in the direction of the arrow), strikes a shoulder 327 of the latch 317 and rocks the latch in an anti-clockwise direction about its pivot 318 against the action of its spring 324 moving the indicator end to the "add" position. This operation moves the latch 317 upwards at its end 320 to bring the shoulder 323 on the latch 313 clear of the face 320a, that is, below the edge 319 of the latch 317, whereupon the latch 313 is turned about its pivot in a clockwise direction by its spring 328, thereby moving the shoulder 323 along the surface 319 of the latch 317 and holding the latch 317 in the "add" position as set.

In this position the latch 313 is free to re-engage and hold the end 315 of the bar member 312 as soon as the bar 87 is operated to engage the counting wheels 27 on the next printing stroke. The parts are then again in the position shown in Fig. 31, and the plate 321 has been moved to bring the word "Add" opposite the pointer.

Cross totals

Means may also be provided for obtaining a cross total of all the holes counted in one bank of counters. To this end the frame 3 of a column of sensing pins may carry a universal bar 329 (Fig. 32) carrying a ledge or shoulder 330 running throughout its length.

The upper ends of the sensing pins 4 are provided with lugs 4a adapted to engage with the ledge 330 so that when any pin in a column goes down it pulls the universal bar down with it. The bar is connected through a Bowden cable 331 to a cross total counter similar to the other counters, and consequently each time a pin in a column actuates one of the ordinary counters in a bank, the universal bar moves down and actuates the cross total counter.

In order to maintain the universal bar 329 in a horizontal position and to prevent it from jamming, it is guided on two pins 332 on frame 23 engaging in slots 333 in the bar 329 and levers 334 and 335 are provided to maintain the bar horizontal. Both levers are pivoted on pins 332. The lever 335 is forked at its ends 336 and 337 and the forked end 336 engages with a pin 338 on the bar 329, while the forked end 337 engages with a pin 339 on the bar 334. The bar 334 is forked at one end 340 and this forked end engages with a pin 341 carried on the bar 329.

Separate sorter

If desired, in a machine according to the invention, a separate pin box may be used for sorting independently of the pin box used for operating the counter mechanism, and thus the capacity of the sorting mechanism is not limited in any way.

Without this separate pin box the sorting capacities are limited to the pin boxes which are fitted for counting. Such an arrangement of separate pin boxes is illustrated diagrammatically in Fig. 33.

The cards are fed from a magazine 342 by means of a picker (not shown) operated by a shaft 343 driven from an eccentric 344 through an eccentric rod 345 and a short arm 346. The cards leaving the magazine first pass under the sorting pin box indicated generally at 347, which is reciprocated in the known manner by means of an eccentric 348 and rod 349. On leaving the pin box 347 the cards pass to a second pin box 350 serving to control the counting, this pin box being operated by an eccentric 351 and rod 352 pivoted at 353 to the frame of the pin box. The eccentrics 348 and 351 are operated in synchronism and the cards are fed from one pin box to the other by feed rolls (not shown) driven through gearing indicated generally at 354, the pin boxes being spaced apart at such a distance that when one card is entering the first pin box another card is also entering the second pin box.

Other embodiments

According to a further feature of the invention the printing hammer construction may be modified (Figs. 34 and 35) in that each hammer 355 may be attached to one end of a spring member 356, for example, a flat spring strip, of which the other end is fixed to the frame of the machine. On the under side of each spring strip there is disposed at a point between its ends a projecting member 357 and beneath all the projecting members is a cam shaft 358 for operating the hammers.

This cam shaft is rotated from the one revolution clutch of the machine in the same manner as the shaft 195 previously described, and when the cam shaft 358 makes one revolution the cam 359 formed thereon engages with the projections on the under side of the spring strips and raises them, the cam being so shaped as to release the spring strips suddenly, whereby the hammers are brought downward forcibly on to the printing ribbon and thereby printing the reading of the printing wheels which lie beneath the hammers.

As before, in order to distribute the power required to operate the printing and restoring mechanism as evenly as possible throughout the cycle, the cams for the three banks are staggered at 45° to one another.

Similarly, the cranks for operating the restoring bars are displaced relatively to one another.

It will be appreciated that owing to the staggered arrangement of the operating cams and cranks, corresponding parts in the three banks are not in similar positions when the machine is quiescent. For example, in the first bank the restoring bars are brought back almost to the zero position for the printing wheels, so that the first movement of the restoring bar operating cranks moves the printing wheels to zero position, and the subsequent movement releases them and allows them to rotate as far as permitted by the counting wheels.

In the second bank the parts will be at 45° to those in the first bank, so that the first movement of the mechanism brings the printing wheels through slightly more than 45° to zero position and then releases them.

In the third bank the parts are at 90° to those in the first bank, so that the printing wheels have to move through slightly more than 90° prior to being zeroized.

Instead of employing the printing hammers referred to above, a printing bar 360 (Figs. 36, 37, and 38) may be employed which extends the entire length of the machine, and which is operated manually by means of a lever 361. This bar when in its inoperative position (Fig. 37) lies immediately above the type, but at an angle of 45° to the plane of the type. At each end of this printing bar 360 is provided adjacent its lower end a pin 362 sliding in a slot 363 in a plate 364 carried in the machine.

The printing bar 360 may also be pivoted at its end to links (not shown) through which the platen feed pawl and ribbon feed pawl may be operated. In order to obtain a print the printing bar is moved into a position in which it is vertical and directly above the type, the arrangement being such that in this position it presses hard upon the ribbon, paper and type, whereby an impression is obtained.

Within the slot 363 in which the projecting pin 362 on the printing bar 360 slides is a spring 365 which tends to push the pin upwardly and maintain the printing bar in its non-operative position. Pivoted to the printing bar at 366 is a link 367 pivoted at its other end 368 to the frame of the machine directly below the slot 363, so that when the printing bar is brought into its vertical or operative position the spring pushes upwards, but cannot move the bar because of the link, since the points of attachment of the link to the frame and to the printing bar are in the same straight line as the centre line of the slot. When, however, the printing bar is moved slightly towards the inoperative position, these three points are no longer in a straight line, and the spring is operative to assist in moving the printing bar towards its inoperative position.

Operation

The whole operation of recording a count from a hole in a card is as follows:—

A card is fed into the pin box of the machine and is held in a sensing position for a period. The sensing pin box descends and a pin penetrates the hole, the other pins being lifted up by the card and locking the pin, which goes through the hole. This pin, being locked to the pin box frame, moves downwards pulling the Bowden wire. The other end of the Bowden wire moves the obstructor arm of the counting unit associated with the pin in question, thereby removing the obstructor arm out of the path of the operating pawl, which is at the moment on its return movement.

The removal of the obstructor permits the units pawl to engage with the wheels as it reaches the end of its stroke. Thus, as the pawl makes its forward stroke it turns the wheel until the wheel is locked in the next tooth position by the check pawl. It may be noted that the movement of the pawl is a harmonic motion and the whole of the forward stroke is operative. This action is repeated until the whole of the counting operation is completed.

Simultaneous with the above operation of the counting and printing mechanisms, a pin 10 and its associated Bowden wire 11 have selected one of the pockets of the sorter to which the card sensed is to go. Only one of the three pin frames 3 is used at one time for actuating the sorting mechanism. It is obvious that the other two frames may be used to obtain certain desired information, from the cards, other than that to which they are being sorted.

It will be appreciated that one feature of the invention includes a ratchet counter in which the ratchet wheels are adapted both to be operated by ratchet pawls and also to be engaged with the teeth of the printing members, thereby acting as gears to control the movement of these printing members into their printing position.

It will also be appreciated that owing to the printing units being arranged in one long row (and to the arrangement of the type and ribbon) the paper may be fed line by line by a ratchet operated roll, previously printed information is not obscured during a printing operation, and a new line is visible immediately after the printing stroke. Further, the paper is easily fed in the form of a sheet, or from a roll, and is also fed straight and flat while printing.

The small width of each unit renders possible very narrow spacing, and the mechanism may be so disposed that each set comes within the width of one set of type, thus enabling three banks of twelve counters each, together with two total counters, to print their readings in columns side by side on a single sheet of paper 30 inches wide.

If desired corresponding obstructor arms in two or more banks or counting units may be connected so as to operate together. In this way corresponding counting units in two or more banks may be made to count simultaneously and by zeroizing the different banks at different times, one bank may be made to accumulate totals while another bank is zeroized and commences to count from zero again. Further, the flat feeding arrangement of the paper makes it possible to write in any headings or notes at any time during a process of counting or recording.

Also, the fact that the paper is fed under the ribbon and printing hammers at the top of the machine is of great advantage in that the main body of the machine is below the paper and does not obscure it; the only portion of the paper which is obscured is that upon which printing is actually taking place, so that when the paper is fed forward in order to print on the next line, the previously printed line is immediately visible.

Again, the unit construction of the printing mechanism renders it possible to remove any unit without upsetting any adjustment, while all the mechanism is readily accessible owing to the method of frame construction, and the ribbon mechanism is reached from the back and can be taken off without affecting anything else.

The counter operating shaft is so disposed that it can be removed from underneath, while the restoring members can be removed from the front and the paper feed mechanism from the top.

What I claim is:—

1. In a counting machine the combination of counting mechanism, printing mechanism for printing the amount stored in the counting mechanism, a driving member, a one revolution clutch adapted to connect the printing mechanism to the driving member, means for starting the driving member, a single control handle and operative connections between the control handle and the counting mechanism, the one revolution clutch and the means for starting the driving member whereby when the control handle is in one position the counting mechanism is operative and the printing mechanism inoperative, whereas when the control handle is moved into a second position the counting mechanism is first rendered inoperative, the starting means for the driving member then actuated and the one revolution clutch finally engaged.

2. A machine according to claim 1 comprising a latch adapted automatically to lock the control member in the position to render the printing mechanism operative and an operative connection between the latch and the one revolution clutch whereby when the one revolution clutch has completed its revolution the latch is released.

3. A machine according to claim 1 comprising means adapted automatically to lock the control member in the position to render the counting mechanism operative and an operative connection between the latch and said counting mechanism whereby the latch is not released until the machine has completed a predetermined number of revolutions.

4. A machine according to claim 1 comprising a latch adapted automatically to lock the control member in the position to render the printing mechanism operative, an operative connection between the latch and the one revolution clutch whereby when the one revolution clutch has completed its revolution the latch is released, and means for preventing engagement of the one revolution clutch except by movement of the control member whereby the said clutch cannot be engaged unless the control member is in the position to render the printing mechanism operative.

ARTHUR THOMAS.